United States Patent
Frank et al.

(10) Patent No.: US 11,378,458 B2
(45) Date of Patent: Jul. 5, 2022

(54) AIRBORNE INSPECTION SYSTEMS AND METHODS

(71) Applicant: Teledyne FLIR, LLC, Thousand Oaks, CA (US)

(72) Inventors: Jeffrey D. Frank, Santa Barbara, CA (US); Michael Kent, Goleta, CA (US); Anna-Karin Lindblom, Taby (SE); Lei Bennett, Santa Barbara, CA (US); Andrew C. Teich, West Linn, OR (US)

(73) Assignee: Teledyne FLIR, LLC, Thousand Oaks, CA (US)

( * ) Notice: Subject to any disclaimer, the term of this patent is extended or adjusted under 35 U.S.C. 154(b) by 0 days.

(21) Appl. No.: 15/984,176

(22) Filed: May 18, 2018

(65) Prior Publication Data
US 2018/0266886 A1 Sep. 20, 2018

Related U.S. Application Data

(63) Continuation of application No. PCT/US2016/000124, filed on Dec. 9, 2016.
(Continued)

(51) Int. Cl.
*G01J 5/00* (2022.01)
*G01J 5/02* (2022.01)
(Continued)

(52) U.S. Cl.
CPC .............. *G01J 5/00* (2013.01); *B64C 39/024* (2013.01); *G01J 5/007* (2013.01); *G01J 5/0265* (2013.01);
(Continued)

(58) Field of Classification Search
CPC ............ B64C 39/024; B64C 2201/123; B64C 2201/127; B64C 2201/141;
(Continued)

(56) References Cited

U.S. PATENT DOCUMENTS

| 3,964,694 A | 6/1976 | Metzger et al. |
| 5,133,605 A * | 7/1992 | Nakamura ........... G08B 13/194 374/129 |

(Continued)

FOREIGN PATENT DOCUMENTS

| CN | 102597722 | 7/2012 |
| CN | 104764533 | 7/2015 |

(Continued)

OTHER PUBLICATIONS

Aghaei et al., "Unmanned Aerial Vehicles in Photovoltaic Systems Monitoring Applications," 29th European Photovoltaic Solar Energy Conference and Exhibition, Sep. 2014, pp. 2734-2739.

(Continued)

*Primary Examiner* — Peet Dhillon
(74) *Attorney, Agent, or Firm* — Haynes and Boone, LLP

(57) ABSTRACT

Flight based infrared imaging systems and related techniques, and in particular UAS based thermal imaging systems, are provided to improve the monitoring capabilities of such systems over conventional infrared monitoring systems. An infrared imaging system is configured to compensate for various environmental effects (e.g., position and/or strength of the sun, atmospheric effects) to provide high resolution and accuracy radiometric measurements of targets imaged by the infrared imaging system. An infrared imaging system is alternatively configured to monitor regulatory limitations on operation of the infrared imaging system and adjust and/or disable operation of the infrared imaging systems accordingly.

20 Claims, 12 Drawing Sheets

Related U.S. Application Data

(60) Provisional application No. 62/402,992, filed on Sep. 30, 2016, provisional application No. 62/374,709, filed on Aug. 12, 2016, provisional application No. 62/374,716, filed on Aug. 12, 2016, provisional application No. 62/265,416, filed on Dec. 9, 2015, provisional application No. 62/265,415, filed on Dec. 9, 2015, provisional application No. 62/265,413, filed on Dec. 9, 2015.

(51) Int. Cl.
| | |
|---|---|
| H02S 50/00 | (2014.01) |
| G01J 5/061 | (2022.01) |
| G06V 20/13 | (2022.01) |
| G01J 5/06 | (2022.01) |
| H04N 5/235 | (2006.01) |
| H04N 5/243 | (2006.01) |
| H04N 5/33 | (2006.01) |
| B64C 39/02 | (2006.01) |
| G03B 15/00 | (2021.01) |
| G08G 5/00 | (2006.01) |
| H02S 50/15 | (2014.01) |
| H04N 7/18 | (2006.01) |
| G01J 5/80 | (2022.01) |
| H02J 4/00 | (2006.01) |
| H04W 84/18 | (2009.01) |

(52) U.S. Cl.
CPC ............. *G01J 5/06* (2013.01); *G01J 5/061* (2013.01); *G03B 15/006* (2013.01); *G06V 20/13* (2022.01); *G08G 5/0091* (2013.01); *H02S 50/00* (2013.01); *H02S 50/15* (2014.12); *H04N 5/2351* (2013.01); *H04N 5/243* (2013.01); *H04N 5/33* (2013.01); *H04N 7/185* (2013.01); *B64C 2201/123* (2013.01); *B64C 2201/127* (2013.01); *B64C 2201/141* (2013.01); *B64C 2201/146* (2013.01); *G01J 5/064* (2022.01); *G01J 5/80* (2022.01); *G01J 5/804* (2022.01); *G01J 2005/0077* (2013.01); *H02J 4/00* (2013.01); *H04W 84/18* (2013.01)

(58) Field of Classification Search
CPC ....... B64C 2201/146; G01J 5/00; G01J 5/007; G01J 5/0265; G01J 5/06; G01J 5/061; G01J 2005/0048; G01J 2005/0055; G01J 2005/0077; G01J 2005/068; G03B 15/006; G06K 9/0063; G08G 5/0091; H02S 50/00; H02S 50/15; H04N 5/2351; H04N 5/243; H04N 5/33; H04N 7/185; H04W 4/046; H04W 84/18; H02J 4/00
See application file for complete search history.

(56) References Cited

U.S. PATENT DOCUMENTS

| | | | |
|---|---|---|---|
| 7,837,371 B2 | 11/2010 | Grötsch et al. | |
| 8,373,758 B2* | 2/2013 | Guha | G06T 7/0004 250/330 |
| 8,718,838 B2 | 5/2014 | Kokkeby et al. | |
| 8,797,550 B2 | 8/2014 | Hays et al. | |
| 9,151,858 B2 | 10/2015 | Hovstein | |
| 2005/0117367 A1 | 6/2005 | Chikugawa | |
| 2006/0081777 A1* | 4/2006 | Bevan | G01J 5/602 250/330 |
| 2009/0321636 A1* | 12/2009 | Ragucci | H04N 5/33 382/173 |
| 2011/0005580 A1* | 1/2011 | Vandermeulen | H02S 40/22 126/609 |
| 2011/0073707 A1 | 3/2011 | Bossert et al. | |
| 2012/0019622 A1 | 1/2012 | Rousselle et al. | |
| 2012/0191350 A1* | 7/2012 | Prata | G01S 3/781 702/3 |
| 2012/0268912 A1 | 10/2012 | Minami et al. | |
| 2012/0287598 A1 | 11/2012 | Tadano | |
| 2012/0287599 A1 | 11/2012 | Nakamura | |
| 2015/0304612 A1* | 10/2015 | Richards | H04N 5/33 348/159 |
| 2015/0377711 A1* | 12/2015 | Steffanson | G01J 5/40 250/349 |
| 2016/0171896 A1* | 6/2016 | Buchmueller | G05D 1/106 701/3 |

FOREIGN PATENT DOCUMENTS

| | | |
|---|---|---|
| DE | 112010004353 | 12/2012 |
| WO | WO 2015/088618 | 6/2015 |
| WO | WO-2015088618 A2 * | 6/2015 |

OTHER PUBLICATIONS

Berni et al., "Remote Sensing of Vegetation from UAV Platforms Using Lightweight Multispectral and Thermal Imaging Sensors," Inter-Commission WG I/V, Jan. 1, 2009, 6 Pages.

Cascella, Guy, "Inner-core characteristics of Ophelia (2005) and Noel (2007) as revealed by Aerosonde data," 28th Conference on Hurricanes and Tropical Meteorology, Apr. 29, 2008, [retrieved on Oct. 24, 2018], 1 Page [online]. Retrieved from the Internet: <https://ams.confex.com/ams/28Hurricanes/techprogram/paper_137864.htm>.

Cassano et al., "UAV Observations of the Wintertime Boundary Layer Over the Terra Bay Polynya, Antarctica," EGU General Assembly Conference Abstracts, 2010, 1 Page, vol. 12.

Dias et al., "Obtaining Potential Virtual Temperature Profiles, Entrainment Fluxes, and Spectra from Mini Unmanned Aerial Vehicle Data," Boundary-Layer Meteorol, Jan. 12, 2012, pp. 93-111, vol. 145, Springer.

"FLIR Vue Pro R—Radiometry Tech Note," FLIR, Jun. 6, 2016 [retrieved on Mar. 16, 2017], 3 Pages [online]. Retrieved from the Internet: <http://www.flir.com/uploadedFiles/sUAS/Products/Vue-Pro-R/SUAS-Radiometry-Technical%20Note-FINAL-060616.pdf>.

Holder et al., "Processing Turbulence Data Collected on board the Helicopter Observation Platform (HOP) with the Empirical Mode Decomposition (EMD) Method," Journal of Atmospheric and Oceanic Technology, May 2011, pp. 671-683.

Khodaei et al., "3D Surface Generation from Aerial Thermal Imagery," ISPRS—The International Archives of the Photogrammetry, Remote Sensing and Spatial Information Sciences, Nov. 25, 2015, pp. 401-405, vol. XL-1-W5.

Lega et al., "Using Advanced Aerial Platforms and Infrared Thermography to Track Environmental Contamination," Environmental Forensics, Dec. 4, 2012, pp. 332-338, vol. 13, No. 4.

Li et al., "Towards automatic power line detection for a UAV surveillance system using pulse coupled neural filter and an improved Hough transform," Machine Vision and Applications, 2009, pp. 677-686, vol. 21, No. 5, Springer-Verlag.

"Lightweight Thermal Imager can be Mounted to UAS for Aerial Inspection Tasks," UAS Vision, Jul. 16, 2013, [retrieved on Oct. 24, 2018], 2 Pages [online]. Retrieved from the Internet: <https://www.uasvision.com/2013/07/16/lightweight-thermal-imager-can-be-mounted-to-uas-for-aerial-inspection-tasks/>.

Lombardo et al., "UAVs to Inspect Solar Farms," engineering.com, May 4, 2014, [retrieved on Oct. 24, 2018], 2 Pages [online]. Retrieved from the Internet: <https://www.engineering.com/3DPrinting/3DPrintingArticles/ArticleID/7544/UAVs-to-Inspect-Solar-Farms.aspx>.

Lu et al., "Parallel Hough Transform-Based Straight Line Detection and Its FPGA Implementation in Embedded Vision," Sensors, Jul. 17, 2013, pp. 9223-9247, vol. 13, No. 7.

(56) References Cited

OTHER PUBLICATIONS

Machado, Christopher R., An Analysis of Meteorological Measurements Using a Miniature Quad-Rotor Unmanned Aerial System, Diss. Monterey, California: Naval Postgraduate School, Jun. 2015, 97 Pages.

Mayer et al., "Profiling the Arctic Stable Boundary Layer in Advent Valley, Svalbard: Measurements and Simulations," Boundary-Layer Meteorol, Mar. 20, 2012, pp. 507-526, vol. 143, Springer.

Murvay et al., "A Survey on Gas Leak Detection and Localization Techniques," Journal of Loss Prevention in the Process Industries, Nov. 1, 2012, pp. 966-973, vol. 25, No. 6.

"Practical Guide Solar Panel Thermography," Testo, Inc., [retrieved on Oct. 24, 2018], 19 Pages [online]. Retrieved from the Internet: <http://www.murcal.com/pdf%20folder/15.testo_thermography_guide.pdf>.

Reineman, Benjamin D., "The Development of Instrumentation and Methods for Measurement of Air-Sea Interaction and Coastal Processes from Manned and Unmanned Aircraft," University of California, San Diego, 2013, pp. 1-183, ProQuest.

Reineman et al., "Development and Testing of Instrumentation for UAV-Based Flux Measurements within Terrestrial and Marine Atmospheric Boundary Layers," Journal of Atmospheric and Oceanic Technology, Jul. 2013, pp. 1295-1319, vol. 30.

Shurkin, Joel, "Surfboard-Sized Drones Crossing Pacific to Monitor Sea Surface," Inside Science, Jan. 17, 2012, [retrieved on Oct. 24, 2018], 6 Pages [online]. Retrieved from the Internet: <https://www.insidescience.org/news/surfboard-sized-drones-crossing-pacific-monitor-sea-surface>.

Thomas et al., "Measurement of Turbulent Water Vapor Fluxes Using a Lightweight Unmanned Aerial Vehicle System," Atmospheric Measurement Techniques, Jan. 27, 2012, pp. 243-257, vol. 5.

Tsanakas et al., "An infrared thermographic approach as a hot-spot detection tool for photovoltaic modules using image histogram and line profile analysis," The International Journal of Condition Monitoring, Mar. 1, 2012, pp. 22-30, vol. 2, Issue 1.

Yan et al., "Automatic Extraction of Power Lines from Aerial Images," IEEE Geoscience and Remote Sensing Letters, Jul. 2007, pp. 387-391, vol. 4, No. 3.

\* cited by examiner

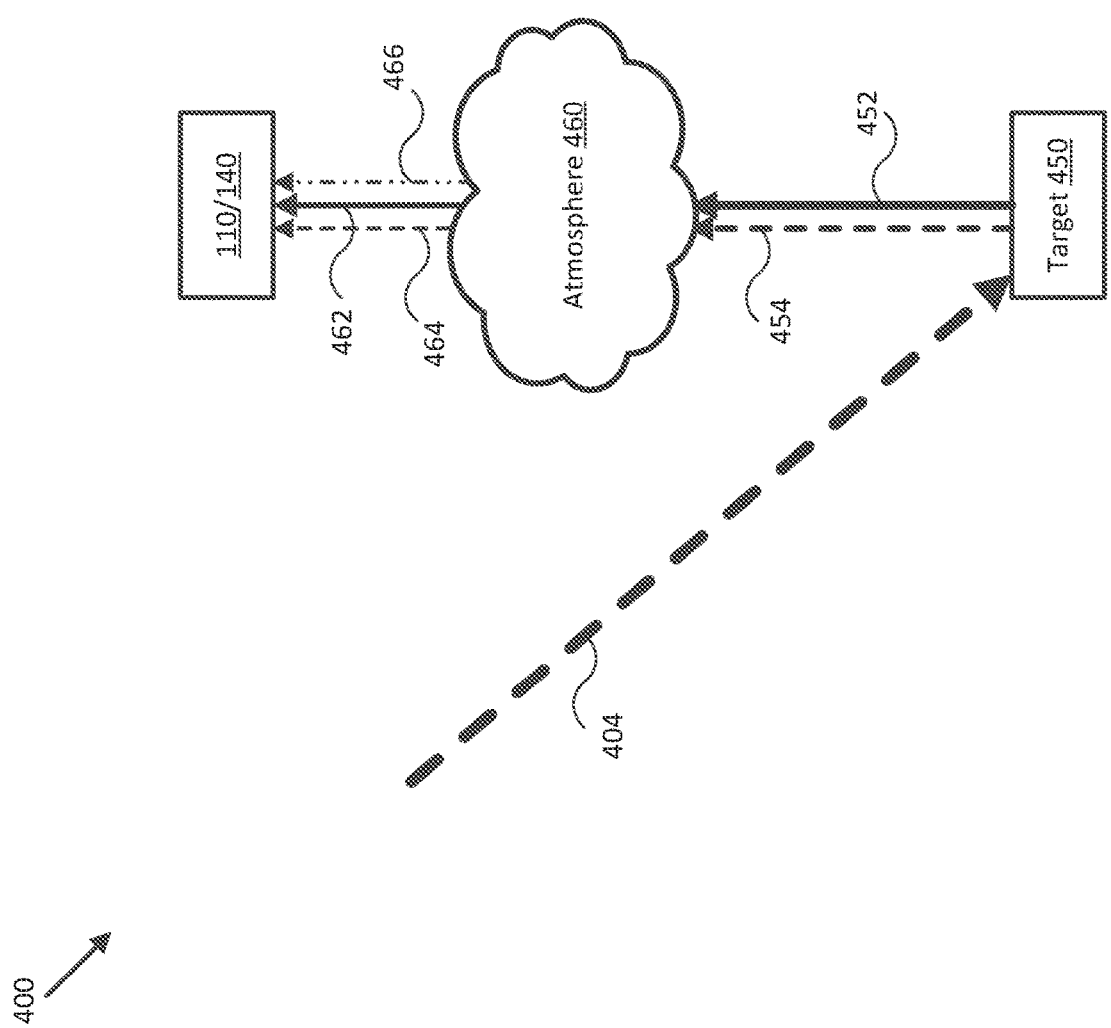

AIRBORNE INSPECTION SYSTEMS AND METHODS

CROSS-REFERENCE TO RELATED APPLICATIONS

This application is a continuation of International Patent Application No. PCT/US2016/000124 filed Dec. 9, 2016 and entitled "AIRBORNE INSPECTION SYSTEMS AND METHODS," which is incorporated herein by reference in its entirety.

International Patent Application No. PCT/US2016/000124 filed Dec. 9, 2016 claims priority to and the benefit of U.S. Provisional Patent Application No. 62/265,413 filed Dec. 9, 2015 and entitled "AIRBORNE INSPECTION SYSTEMS AND METHODS" which is incorporated by reference in its entirety.

International Patent Application No. PCT/US2016/000124 filed Dec. 9, 2016 claims priority to and the benefit of U.S. Provisional Patent Application No. 62/265,415 filed Dec. 9, 2015 and entitled "AIRBORNE RADIOMETRIC CAMERA SYSTEMS AND METHODS" which is hereby incorporated by reference in its entirety.

International Patent Application No. PCT/US2016/000124 filed Dec. 9, 2016 claims priority to and the benefit of U.S. Provisional Patent Application No. 62/265,416 filed Dec. 9, 2015 and entitled "POSITION ENABLED INFRARED CAMERA CONTROL SYSTEMS AND METHODS" which is hereby incorporated by reference in its entirety.

International Patent Application No. PCT/US2016/000124 filed Dec. 9, 2016 claims priority to and the benefit of U.S. Provisional Patent Application No. 62/374,709 filed Aug. 12, 2016 and entitled "UNMANNED AERIAL SYSTEM BASED THERMAL IMAGING SYSTEMS AND METHODS" which is hereby incorporated by reference in its entirety.

International Patent Application No. PCT/US2016/000124 filed Dec. 9, 2016 claims priority to and the benefit of U.S. Provisional Patent Application No. 62/374,716 filed Aug. 12, 2016 and entitled "UNMANNED AERIAL SYSTEM BASED THERMAL IMAGING AND AGGREGATION SYSTEMS AND METHODS" which is hereby incorporated by reference in its entirety.

International Patent Application No. PCT/US2016/000124 filed Dec. 9, 2016 claims priority to and the benefit of U.S. Provisional Patent Application No. 62/402,992 filed Sep. 30, 2016 and entitled "UNMANNED AERIAL SYSTEM BASED THERMAL IMAGING SYSTEMS AND METHODS" which is hereby incorporated by reference in its entirety.

TECHNICAL FIELD

The present invention relates generally to infrared imaging and, more particularly, to thermal imaging from unmanned aerial systems.

BACKGROUND

Infrared imaging has long been used to monitor operation of mechanical, gas handling, and power generation systems. As the size and weight of infrared cameras has decreased over time, their use has expanded from primarily ground based monitoring to hand held monitoring and, in recent systems, monitoring from the air through use of unmanned aerial systems (UASs). As the use of flight based infrared monitoring systems increases, there is a concomitant need to increase the reliability and accuracy of such systems while adhering to regulatory limitations on their use.

SUMMARY

Flight based infrared imaging systems and related techniques, and in particular UAS based thermal imaging systems, are provided to improve the monitoring capabilities of such systems over conventional infrared monitoring systems. One or more embodiments of the described infrared imaging systems may advantageously include an infrared camera configured to communication with one or more of a controller, an orientation sensor, a gyroscope, an accelerometer, and/or a position sensor providing operational control and status of a coupled flight platform and/or the infrared camera. For example, the sensors may be mounted to or within the flight platform (e.g., a manned aircraft, a UAS, and/or other flight platform), or may be integrated with the controller.

In one embodiment, an apparatus includes an infrared camera configured to acquire a plurality of first image frames and output first image data associated with the plurality of first image frames; and a flight platform, configured to couple to the infrared camera, wherein one or both of the infrared camera and the flight platform is configured to: determine a location of the infrared camera, determine that the location is a prohibited location, and change a characteristic of the infrared camera.

In another embodiment, an apparatus includes an infrared camera configured to capture and provide infrared image data; a location determination device associated with the infrared camera and configured to determine a location of the infrared camera; and a logic device, associated with the infrared camera and location determination device, configured to: determine that the infrared camera is in a prohibited area; and modify, responsive to the determination that the infrared camera is in the prohibited area, an operational characteristic of the infrared camera.

In another embodiment, a method includes determining a location of an infrared camera; determining that the location is a prohibited location; and changing an operational characteristic of the infrared camera.

In one embodiment, a system includes an infrared camera configured to capture infrared images of a target from a flight platform; and a logic device configured to receive the infrared images captured by the infrared camera, wherein the logic device is configured to: receive an air temperature and a relative humidity associated with the target, and determine a radiance adjustment associated with the target that is based, at least in part, on the air temperature and the relative humidity, wherein the radiance adjustment is configured to compensate for atmospheric interference between the infrared camera and the target.

In another embodiment, a method includes receiving an air temperature and a relative humidity associated with a target, and determining a radiance adjustment associated with the target that is based, at least in part, on the air temperature and the relative humidity, wherein the radiance adjustment is configured to compensate for atmospheric interference between an infrared camera and the target.

In one embodiment, a system includes an infrared camera configured to capture infrared images of a target from a flight platform; an irradiance detector configured to detect a background radiance associated with the target from the flight platform; and a logic device, wherein the logic device is configured to: receive the infrared images captured by the infrared camera and the background radiance from the irradiance detector, and determine a radiance adjustment associated with the target that is based, at least in part, on the background radiance, wherein the radiance adjustment is configured to compensate for a reflected background radiance reflected by the target towards the infrared detector.

In another embodiment, a method includes receiving infrared images of a target captured from a flight platform by an infrared camera; receiving a background radiance associated with the target from an irradiance detector, and determining a radiance adjustment associated with the target that is based, at least in part, on the background radiance, wherein the radiance adjustment is configured to compensate for a reflected background radiance reflected by the target towards the infrared detector.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference Will be made to the appended sheets of drawings that will first be described briefly.

BRIEF DESCRIPTION OF THE DRAWINGS

FIG. 4 illustrates a diagram of atmospheric interference and its effects on operation of an infrared imaging system in accordance with an embodiment of the disclosure.

Embodiments of the present invention and their advantages are best understood by referring to the detailed description that follows. It should be appreciated that like reference numerals are used to identify like elements illustrated in one or more of the figures.

DETAILED DESCRIPTION

Flight based infrared imaging systems and related techniques, and in particular UAS based thermal imaging systems, are provided to improve the monitoring capabilities of such systems over conventional infrared monitoring systems. In some embodiments, an infrared imaging system may be configured to compensate for various environmental effects (e.g., position and/or strength of the sun, atmospheric effects) to provide high resolution and accuracy radiometric measurements of targets imaged by the infrared imaging system, as described herein. In other embodiments, an infrared imaging system may be configured to monitor regulatory limitations on operation of the infrared imaging system and adjust and/or disable operation of the infrared imaging systems accordingly, as described herein.

Figure 1:
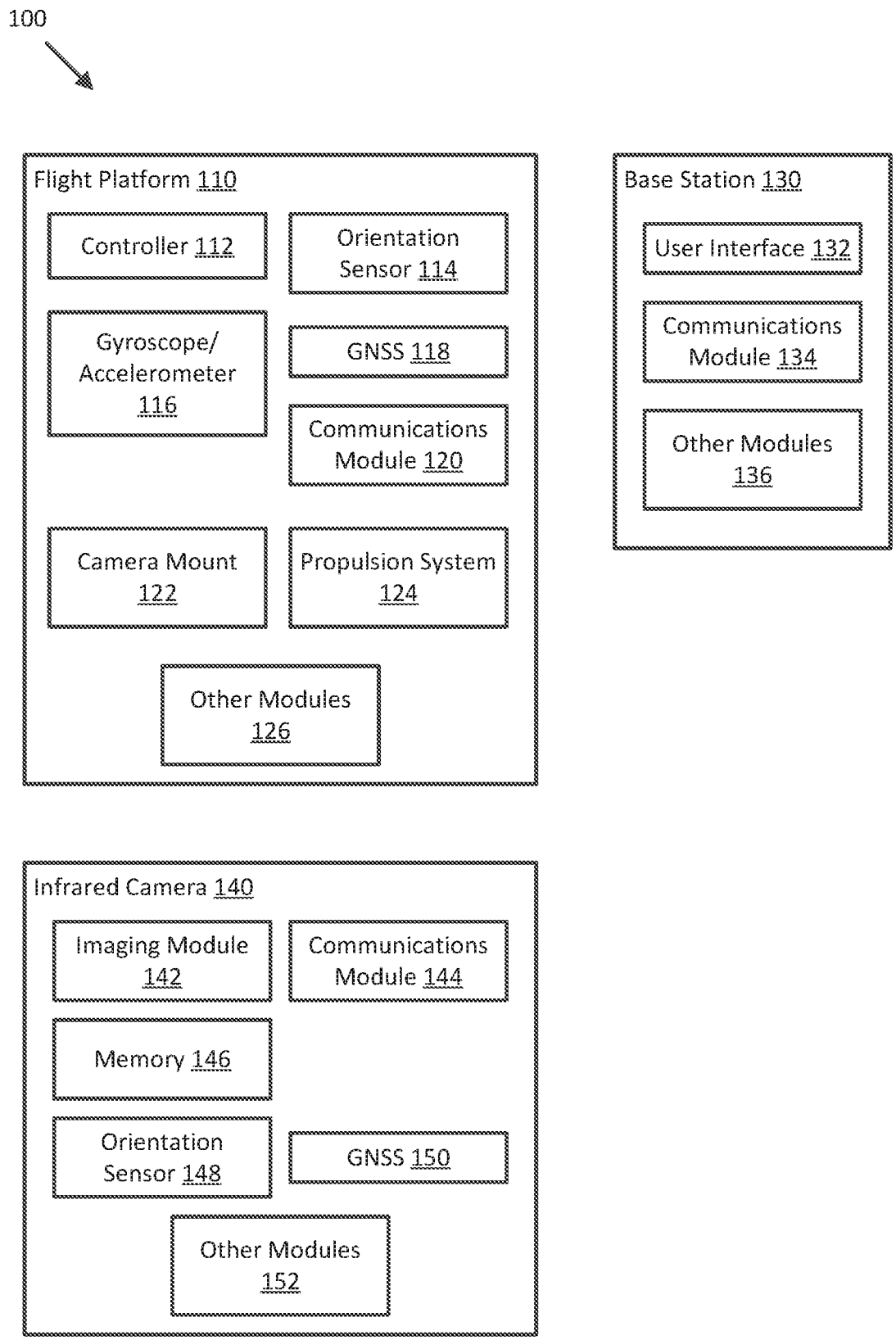
FIG. 1 illustrates a diagram of a mobile structure in accordance with an embodiment of the disclosure.

FIG. 1 illustrates a block diagram of infrared imaging system 100 in accordance with an embodiment of the disclosure. In some embodiments, system 100 may be configured to fly over a target and image the target using infrared camera 140. Resulting imagery may be processed (e.g., by infrared camera 140, flight platform 110, and/or base station 130) and displayed to a user through use of user interface 132 (e.g., one or more displays such as a multi-function display (MFD), a portable electronic device such as a tablet, laptop, or smart phone, or other appropriate interface) and/or stored in memory for later viewing and/or analysis. In some embodiments, system 100 may be configured to use such imagery to control operation of flight platform 110 and/or infrared camera 140, as described herein, such as controlling camera mount 122 to aim infrared camera 122 towards a particular direction, or controlling propulsion system 124 to move flight platform to a desired position relative to a target.

In the embodiment shown in FIG. 1, infrared imaging system 100 includes flight platform 110, base station 130, and at least one infrared camera 140. Flight platform 110 may be configured to fly and position and/or aim infrared camera 140 (e.g., relative to a designated or detected target) and may include one or more of a controller 112, an orientation sensor 114, a gyroscope/accelerometer 116, a global navigation satellite system (GNSS) 118, a communications module 120, a camera mount 122, a propulsion system 124, and other modules 126. Operation of flight platform 110 may be substantially autonomous and/or partially or completely controlled by base station 130, which may include one or more of a user interface 132, a communications module 134, and other modules 136. Infrared camera 140 may be physically coupled to flight platform 110 and be configured to capture infrared images of a target position, area, and/or object(s) as selected and/or framed by operation of flight platform 110 and/or base station 130. In some embodiments, one or more of the elements of system 100 may be implemented in a combined housing or structure that can be coupled to or within flight platform 110 and/or held or carried by a user of system 100.

Controller 112 may be implemented as any appropriate logic device (e.g., processing device, microcontroller, processor, application specific integrated circuit (ASIC), field programmable gate array (FPGA), memory storage device, memory reader, or other device or combinations of devices)

that may be adapted to execute, store, and/or receive appropriate instructions, such as software instructions implementing a control loop for controlling various operations flight platform 110 and/or other elements of system 100, for example. Such software instructions may also implement methods for processing infrared images and/or other sensor signals, determining sensor information, providing user feedback (e.g., through user interface 132), querying devices for operational parameters, selecting operational parameters for devices, or performing any of the various operations described herein (e.g., operations performed by logic devices of various devices of system 100).

In addition, a machine readable medium may be provided for storing non-transitory instructions for loading into and execution by controller 112. In these and other embodiments, controller 112 may be implemented with other components where appropriate, such as volatile memory, non-volatile memory, one or more interfaces, and/or various analog and/or digital components for interfacing with devices of system 100. For example, controller 112 may be adapted to store sensor signals, sensor information, parameters for coordinate frame transformations, calibration parameters, sets of calibration points, and/or other operational parameters, over time, for example, and provide such stored data to a user using user interface 132. In some embodiments, controller 112 may be integrated with one or more other elements of flight platform 110, for example, or distributed as multiple logic devices within flight platform 110, base station 130, and/or infrared camera 140.

Orientation sensor 114 may be implemented as one or more of a compass, float, accelerometer, and/or other device capable of measuring an orientation of flight platform 110 (e.g., magnitude and direction of roll, pitch, and/or yaw, relative to one or more reference orientations such as gravity and/or Magnetic North) and providing such measurements as sensor signals that may be communicated to various devices of system 100. Gyroscope/accelerometer 116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of flight platform 110 and providing such measurements as sensor signals that may be communicated to other devices of system 100 (e.g., user interface 132, controller 112).

GNSS 118 may be implemented according to any global navigation satellite system, including a GPS, GLONASS, and/or Galileo based receiver and/or other device capable of determining absolute and/or relative position of flight platform 110 (e.g., or an element of flight platform 110) based on wireless signals received from space-born and/or terrestrial sources (e.g., eLoran, and/or other at least partially terrestrial systems), for example, and capable of providing such measurements as sensor signals that may be communicated to various devices of system 100. In some embodiments, GNSS 118 may include an altimeter, for example, or may be used to provide an absolute altitude.

Communications module 120 may be implemented as any wired and/or wireless communications module configured to transmit and receive analog and/or digital signals between elements of system 100. For example, communications module 120 may be configured to receive flight control signals from base station 130 and provide them to controller 112 and/or propulsion system 124. In other embodiments, communications module 120 may be configured to receive infrared images (e.g., still images or video images) from infrared camera 140 and relay the infrared images to controller 112 and/or base station 130. In some embodiments, communications module 120 may be configured to support spread spectrum transmissions, for example, and/or multiple simultaneous communications channels between elements of system 100.

In some embodiments, camera mount 122 may be implemented as an actuated gimbal mount, for example, that may be controlled by controller 112 to stabilize infrared camera 140 relative to a target or to aim infrared camera 140 according to a desired direction and/or relative position. As such, camera mount 122 may be configured to provide a relative orientation of infrared camera 140 (e.g., relative to an orientation of flight platform 110) to controller 112 and/or communications module 120. In other embodiments, camera mount 122 may be implemented as a fixed mount. In various embodiments, camera mount 122 may be configured to provide power, support wired communications, provide a shutter, and/or otherwise facilitate flight operation of infrared camera 140. In further embodiments, camera mount 122 may be configured to couple to a laser pointer, range finder, and/or other device, for example, to support, stabilize, power, and/or aim multiple devices (e.g., infrared camera 140 and one or more other devices) substantially simultaneously.

Propulsion system 124 may be implemented as one or more propellers, turbines, or other thrust-based propulsion systems, and/or other types of propulsion systems that can be used to provide motive force and/or lift to flight platform 110 and/or to steer flight platform 110. In some embodiments, propulsion system 124 may include multiple propellers (e.g., a tri, quad, hex, oct, or other type "copter") that can be controlled (e.g., by controller 112) to provide lift and motion for flight platform 110 and to provide an orientation for flight platform 110. In other embodiments, propulsion system 110 may be configured primarily to provide thrust while other structures of flight platform 110 provide lift, such as in a fixed wing embodiment (e.g., where wings provide the lift) and/or an aerostat embodiment (e.g., balloons, airships, hybrid aerostats). In various embodiments, propulsion system 124 may be implemented with a portable power supply, such as a battery and/or a combustion engine/generator and fuel supply.

Other modules 126 may include other and/or additional sensors, actuators, communications modules/nodes, and/or user interface devices used to provide additional environmental information of flight platform 110, for example. In some embodiments, other modules 126 may include a humidity sensor, a wind and/or water temperature sensor, a barometer, an altimeter, a radar system, a visible spectrum camera, an additional infrared camera (with an additional mount), an irradiance detector, and/or other environmental sensors providing measurements and/or other sensor signals that can be displayed to a user and/or used by other devices of system 100 (e.g., controller 112) to provide operational control of flight platform 110 and/or system 100 or to process infrared imagery to compensate for environmental conditions, such as an water content in the atmosphere between infrared camera 140 and a target, for example. In some embodiments, other modules 126 may include one or more actuated and/or articulated devices (e.g., multi-spectrum active illuminators, visible and/or IR cameras, radars, sonars, and/or other actuated devices) coupled to flight platform 110, where each actuated device includes one or more actuators adapted to adjust an orientation of the device, relative to flight platform 110, in response to one or more control signals (e.g., provided by controller 112).

User interface 132 of base station 130 may be implemented as one or more of a display, a touch screen, a keyboard, a mouse, a joystick, a knob, a steering wheel, a yoke, and/or any other device capable of accepting user input and/or providing feedback to a user. In various embodiments, user interface 132 may be adapted to provide user input (e.g., as a type of signal and/or sensor information transmitted by communications module 134 of base station 130) to other devices of system 100, such as controller 112. User interface 132 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 132 may be adapted to display a time series of various sensor information and/or other parameters as part of or overlaid on a graph or map, which may be referenced to a position and/or orientation of flight platform 110 and/or other elements of system 100. For example, user interface 132 may be adapted to display a time series of positions, headings, and/or orientations of flight platform 110 and/or other elements of system 100 overlaid on a geographical map, which may include one or more graphs indicating a corresponding time series of actuator control signals, sensor information, and/or other sensor and/or control signals.

In some embodiments, user interface 132 may be adapted to accept user input including a user-defined target heading, waypoint, route, and/or orientation for an element of system 100, for example, and to generate control signals to cause flight platform 110 to move according to the target heading, route, and/or orientation. In other embodiments, user interface 132 may be adapted to accept user input modifying a control loop parameter of controller 112, for example.

In further embodiments, user interface 132 may be adapted to accept user input including a user-defined target attitude, orientation, and/or position for an actuated device (e.g., infrared camera 140) associated with flight platform 110, for example, and to generate control signals for adjusting an orientation and/or position of the actuated device according to the target attitude, orientation, and/or position. Such control signals may be transmitted to controller 112 (e.g., using communications modules 134 and 120), which may then control flight platform 110 accordingly.

Communications module 134 may be implemented as any wired and/or wireless communications module configured to transmit and receive analog and/or digital signals between elements of system 100. For example, communications module 134 may be configured to transmit flight control signals from user interface 132 to communications module 120 or 144. In other embodiments, communications module 134 may be configured to receive infrared images (e.g., still images or video images) from infrared camera 140. In some embodiments, communications module 134 may be configured to support spread spectrum transmissions, for example, and/or multiple simultaneous communications channels between elements of system 100.

Other modules 136 of base station 130 may include other and/or additional sensors, actuators, communications modules/nodes, and/or user interface devices used to provide additional environmental information associated with base station 130, for example. In some embodiments, other modules 136 may include a humidity sensor, a wind and/or water temperature sensor, a barometer, a radar system, a visible spectrum camera, an infrared camera, a GNSS, and/or other environmental sensors providing measurements and/or other sensor signals that can be displayed to a user and/or used by other devices of system 100 (e.g., controller 112) to provide operational control of flight platform 110 and/or system 100 or to process infrared imagery to compensate for environmental conditions, such as an water content in the atmosphere approximately at the same altitude and/or within the same area as base station 130, for example. In some embodiments, other modules 136 may include one or more actuated and/or articulated devices (e.g., multi-spectrum active illuminators, visible and/or IR cameras, radars, sonars, and/or other actuated devices), where each actuated device includes one or more actuators adapted to adjust an orientation of the device in response to one or more control signals (e.g., provided by user interface 132).

Imaging module 142 of infrared camera 140 may be implemented as a cooled and/or uncooled array of detector elements, such as quantum well infrared photodetector elements, bolometer or microbolometer based detector elements, type II superlattice based detector elements, and/or other infrared spectrum detector elements that can be arranged in a focal plane array. In various embodiments, imaging module 142 may include one or more logic devices (e.g., similar to controller 112) that can be configured to process imagery captured by detector elements of imaging module 142 before providing the imagery to memory 146 or communications module 144. More generally, imaging module 142 may be configured to perform any of the operations or methods described herein, at least in part, or in combination with controller 112 and/or user interface 132.

In some embodiments, infrared camera 140 may be implemented with a second or additional imaging modules similar to imaging module 142, for example, that may be include detector elements configured to detect other spectrums, such as visible light, ultraviolet, and/or other spectrums or subsets of spectrums. In various embodiments, such additional imaging modules may be calibrated or registered to imaging module 142 such that images captured by each imaging module occupy a known and at least partially overlapping field of view of the other imaging modules, thereby allowing different spectrum images to be geometrically registered to each other (e.g., by scaling and/or positioning). In some embodiments, different spectrum images may be registered to each other using pattern recognition processing in addition or as an alternative to reliance on a known overlapping field of view.

Communications module 144 of infrared camera 140 may be implemented as any wired and/or wireless communications module configured to transmit and receive analog and/or digital signals between elements of system 100. For example, communications module 144 may be configured to transmit infrared images from imaging module 142 to communications module 120 or 134. In other embodiments, communications module 144 may be configured to receive control signals (e.g., control signals directing capture, focus, selective filtering, and/or other operation of infrared camera 140) from controller 112 and/or user interface 132. In some embodiments, communications module 144 may be configured to support spread spectrum transmissions, for example, and/or multiple simultaneous communications channels between elements of system 100.

Memory 146 may be implemented as one or more machine readable mediums and/or logic devices configured to store software instructions, sensor signals, control signals, operational parameters, calibration parameters, infrared images, and/or other data facilitating operation of system 100, for example, and provide it to various elements of system 100. Memory 146 may also be implemented, at least in part, as removable memory, such as a secure digital memory card for example including an interface for such memory.

Orientation sensor 148 of infrared camera 140 may be implemented similar to orientation sensor 114 or gyroscope/accelerometer 116, and/or another device capable of measuring an orientation of infrared camera 140 and/or imaging module 142 (e.g., magnitude and direction of roll, pitch, and/or yaw, relative to one or more reference orientations such as gravity and/or Magnetic North) and providing such measurements as sensor signals that may be communicated to various devices of system 100. GNSS 150 of infrared camera 140 may be implemented according to any global navigation satellite system, including a GPS, GLONASS, and/or Galileo based receiver and/or other device capable of determining absolute and/or relative position of infrared camera 140 (e.g., or an element of infrared camera 140) based on wireless signals received from space-born and/or terrestrial sources, for example, and capable of providing such measurements as sensor signals that may be communicated to various devices of system 100.

Other modules 152 of infrared camera 140 may include other and/or additional sensors, actuators, communications modules/nodes, cooled or uncooled optical filters, and/or user interface devices used to provide additional environmental information associated with infrared camera 140, for example. In some embodiments, other modules 152 may include a humidity sensor, a wind and/or water temperature sensor, a barometer, a radar system, a visible spectrum camera, an infrared camera, a GNSS, and/or other environmental sensors providing measurements and/or other sensor signals that can be displayed to a user and/or used by imaging module 142 or other devices of system 100 (e.g., controller 112) to provide operational control of flight platform 110 and/or system 100 or to process infrared imagery to compensate for environmental conditions, such as an water content in the atmosphere approximately at the same altitude and/or within the same area as infrared camera 140, for example.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sonar data and/or imagery, for example, or for transmitting and/or receiving communications, such as sensor signals, sensor information, and/or control signals, between one or more devices of system 100.

In addition, one or more machine readable mediums may be provided for storing non-transitory instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements.

Each element of system 100 may include one or more batteries, capacitors, or other electrical power storage devices, for example, and may include one or more solar cell modules or other electrical power generating devices. In some embodiments, one or more of the devices may be powered by a power source for flight platform 110, using one or more power leads. Such power leads may also be used to support one or more communication techniques between elements of system 100.

Figure 2:
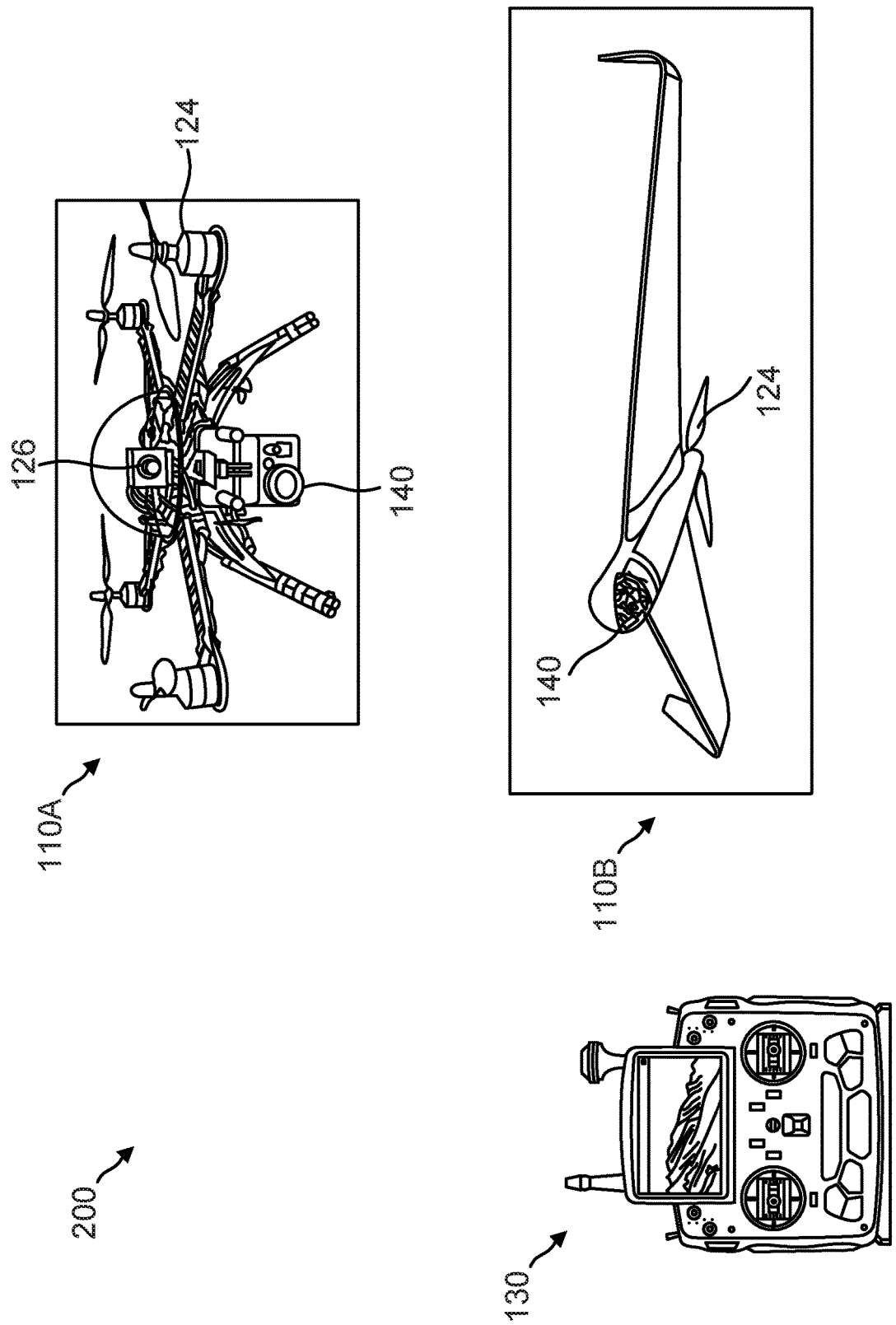
FIG. 2 illustrates a diagram of a watercraft in accordance with an embodiment of the disclosure.

FIG. 2 illustrates a diagram of infrared imaging system 200 in accordance with an embodiment of the disclosure. In the embodiment shown in FIG. 2, infrared imaging system 100B includes base station 130, flight platform 110A with infrared camera 140 and flight platform 110B with infrared camera 140, where base station 130 may configured to control motion, position, and/or orientation of flight platform 110A, flight platform 110B, and/or infrared cameras 140. Also shown in FIG. 2 is an additional infrared camera (e.g., other modules 126) coupled to flight platform 110A, which may be used to detect environmental irradiance, as described more fully herein.

Figure 3A:
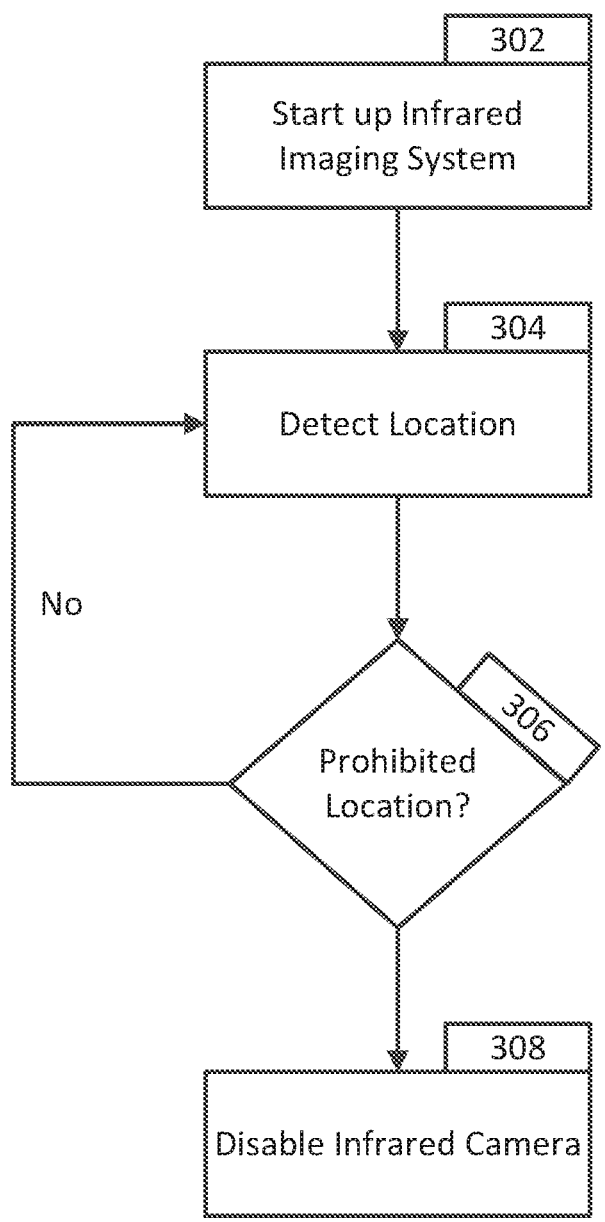
FIG. 3A illustrates a flowchart of a process for disabling a thermal camera of a thermal imaging system in accordance with an embodiment of the disclosure.

FIG. 3A illustrates a flowchart of a process of disabling a UAS camera in accordance with an embodiment of the disclosure. For example, certain governmental regulations prohibit export of UASs and/or infrared cameras with certain capabilities to certain countries or areas. Additionally, certain areas may prohibit the flight of UASs with certain infrared cameras (e.g., all infrared cameras or infrared cameras with certain capabilities). Such areas and/or countries where export is prohibited or where flight of UASs with certain infrared cameras is prohibited may be referred to as "prohibited areas." The process illustrated in FIG. 3A may be performed to detect a location of infrared camera 140, which may be mounted to flight platform 110, and determine whether infrared camera 140 is located within such a restricted area. Additionally, the process illustrated in FIG. 3A may also be performed by an embodiment of infrared camera 140 that may not be coupled to a flight platform and thus, not receive data from a flight platform.

In block 302, an infrared imaging system (e.g., infrared imaging system 100) may be powered up. As such, previous to block 302, the infrared imaging system may be shut off or in a sleep mode. Using infrared imaging system 100 as an example, in block 302, power may be provided to one or more systems of infrared imaging system 100 (e.g., one or more systems of flight platform 110, base station 130, and/or infrared camera 140).

In block 304, after power up of infrared imaging system 100, infrared imaging system 100 may detect its location or the location of infrared camera 140 within infrared imaging system 100. In certain situations, infrared camera 140 may be coupled to flight platform 110 and thus certain systems of infrared camera 140 and flight platform 110 may be communicatively connected. Accordingly, the location of infrared camera 140 may be determined with data from one or more of GNSS 118, orientation sensor 114, other modules 126, communications module 120, gyroscope/accelerometer 116, GNSS 150, orientation sensor 148, communications module 144, other modules 152, and other systems of infrared imaging system 100.

For example, infrared camera 140 may receive data from GNSS 118 and other systems of flight platform 110. Infrared camera 140 may then use data from GNSS 118 to calculate the location of infrared camera 140. In another example, data from GNSS 150 may be used by infrared camera 140 to calculate the location of infrared camera 140. In a further example, infrared camera 140 may receive data from communications module 120 and/or 144. Data from communications module 120 and/or 144 may include information that infrared camera 140 may then use to calculate its location.

In another example, infrared camera 140 may be coupled to flight platform 110. Flight platform 110 may calculate the location of flight platform 110 and/or infrared camera 140 (e.g., with controller 112 and/or other systems) through, for example, data from GNSS 118 and/or 150 or other systems, and may then communicate the calculated location to infrared camera 140.

In certain embodiments, the location of infrared camera 140 may be determined during power up (e.g., concurrent with block 302) or shortly after power up. Additionally, the infrared imaging system 100 and/or infrared camera 140 may, after power up, continuously check to confirm location of infrared camera 140. As such, after power up, data from GNSS 118 and/or 150, communications module 120 and/or 144, and other systems may be used to calculate the location of infrared camera 140. In certain such embodiments, the location of infrared camera 140 may be calculated periodically (e.g., after a pre-defined period of time), when movement past a certain threshold of flight platform 110 and/or infrared camera 140 (e.g., past a certain distance, acceleration, or velocity), when communications module within infrared imaging system 100 receives certain commands, and/or when certain other conditions are met.

In certain situations, communication between GNSS 118 and/or 150 and certain navigational data sources (e.g., satellites, cellular phone towers, and/or other devices) may be lost. In such situations, other systems within infrared imaging system 100 may be used to determine the location of infrared camera 140. Such determinations may, in certain embodiments, be based off of a last calculated location (e.g., a location last determined with GNSS data) and additional calculations may be performed to determine a new position of infrared camera 140 from the last calculated location. For example, data from gyroscope/accelerometer 116, as well as other systems that may determine dynamic data associated with movement of the inertia camera, such as inertial measurement systems, may be used to determine a distance and/or direction traveled from the last calculated location and, thus, calculate the current location of infrared camera 140.

In certain embodiments, a configuration of infrared camera 140 may also be determined. As such, infrared camera 140 may include data, such as internal codes, indicating its configuration. Infrared camera 140, flight platform 110, base station 130, and/or other systems of infrared imaging system 100 may determine the configuration of infrared camera 140.

After the location of infrared camera 140 has been determined in block 304, whether infrared camera 140 is in a prohibited location is then determined in block 306. In certain embodiments a memory within imaging system 100 may include data indicating a list of prohibited locations. The calculated location of infrared camera 140 may then be checked against the list of prohibited locations. The prohibited locations may be, for example, locations where export of infrared camera 140 is prohibited or where operation of UASs are not allowed. In certain embodiments, the list may be updated, e.g., communications may be received by communications modules 120, 136, and/or 144 indicating an updated listing of prohibited locations. Communications indicating an updated listing may be received when areas are added or deleted from the list, may be periodically received, or may be received due to another reason. Prohibited locations may include countries, states, provinces, cities, and/or regions within the countries, states, provinces, and cities, as well as other geographical areas. Certain such embodiments may update or attempt to update the list of prohibited locations after the location of infrared camera 140 has been determined. If the calculated location of infrared camera 140 is within a prohibited location, the process may continue to block 308. If the infrared camera 140 is determined to not be within a calculated location, the process may revert to block 304 or may finish.

Certain embodiments may, in addition to determining whether the calculated location is a prohibited location, also determine whether the configuration of infrared camera 140 is prohibited within the prohibited location. In such an example, only certain configurations of infrared camera 140 may be prohibited within a prohibited location. Accordingly, the configuration of the infrared camera 140 may then be checked to determine whether the configuration is a configuration prohibited within the location. If infrared camera 140 is a prohibited configuration that is currently located within a prohibited location, the process may then continue to block 308. Otherwise, the process may revert to block 304 or may finish.

In block 308, infrared camera 140 is disabled. Infrared camera 140 may be disabled temporarily (e.g., infrared camera 140 or certain functions of infrared camera 140 may not function while infrared camera 140 is determined to be within the prohibited location) or permanently (e.g., infrared camera 140 or certain functions of infrared camera 140 may be permanently disabled). Additionally or alternatively, the quality of data and/or images outputted by infrared camera 140, such as framerate, resolution, color depth, and other parameters, may also be affected in block 308. Disabling infrared camera 140 may prevent infrared camera 140 from obtaining certain or all images and/or video. Infrared camera 140 may be disabled electronically (e.g., via software that may shut off certain functions) or mechanically (e.g., through actuation of a fuse or through mechanical actions such as, for example, removing wires or damaging portions of infrared camera 140 in other ways).

In addition to or alternative to disabling infrared camera 140, in block 308, flight platform 110 may also be prevented from operating. Accordingly, if infrared camera 140, flight platform 110, or another portion of infrared imaging system 100 is detected to be within a prohibited location, flight platform 110 may be instructed to not take off despite operator inputs or be instructed to land. Additionally, an indication or message may be displayed on, for example, user interface 132 of base station 130 to communicate to the user that infrared camera 140 and/or flight platform 110 is operating in a prohibited location.

Figure 3B:
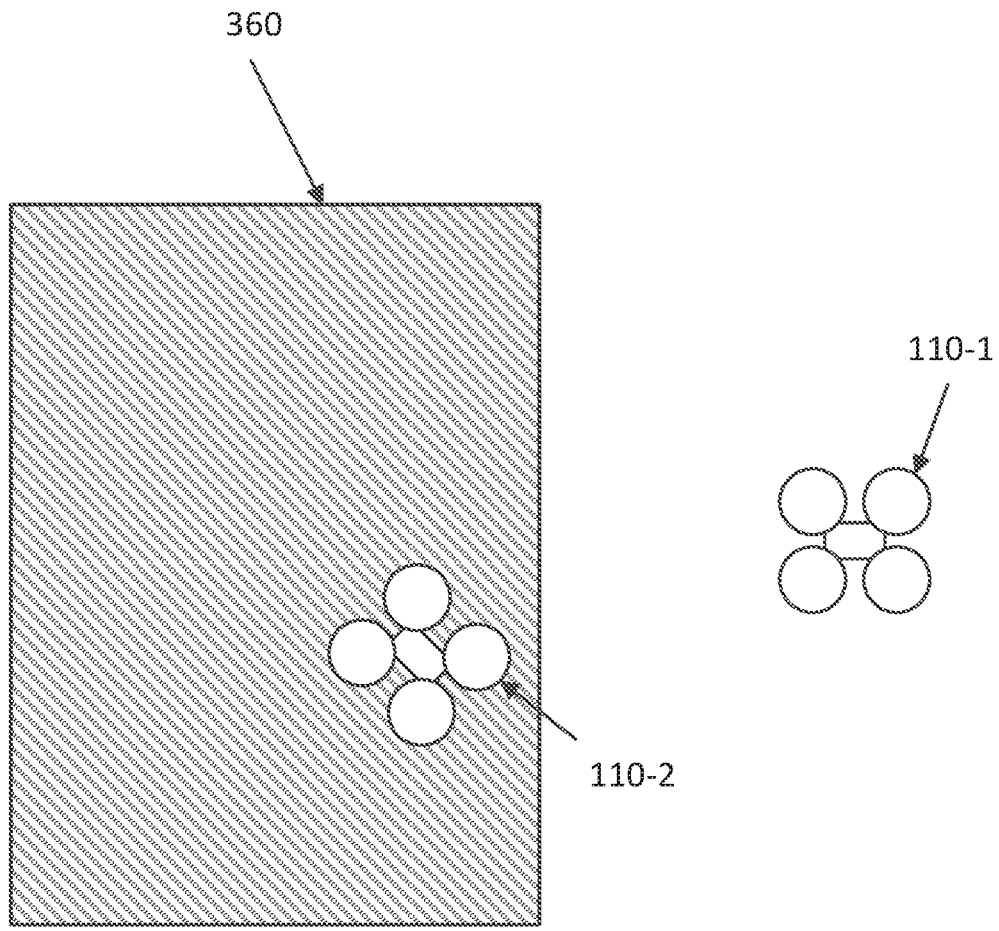
FIG. 3B illustrates an example of disabling a thermal camera of a thermal imaging system according to the process of FIG. 3A in accordance with an embodiment of the disclosure.

FIG. 3B illustrates an example of disabling a UAS camera according to the process of FIG. 3A in accordance with an embodiment of the disclosure. FIG. 3B illustrates two flight platforms, flight platform 110-1 and 110-2, that may each include an infrared camera coupled to the respective flight platforms. Flight platform 110-1 may be located outside of prohibited location 360, while flight platform 110-2 may be located within prohibited location 360.

Flight platform 110-1 may determine its location and then determine that it is not within prohibited location 360. Accordingly, flight platform 110-1 and/or its attached infrared camera may operate normally.

Flight platform 110-2 may determine its location and then determine that it is within prohibited location 360. Flight platform 110-2 may also determine the configuration of its infrared camera. If the configuration of its infrared camera is prohibited to be within prohibited location 360 and/or prohibited to be exported to prohibited location 360, flight platform 110-2 and/or its attached infrared camera may disable the attached infrared camera.

In certain embodiments, the attached infrared camera of flight platform 110-2 may be permanently disabled. In other embodiments, the attached infrared camera may be temporarily disabled. That is, once it is detected that the infrared camera is outside of prohibited location 360 (e.g., may be at, for example, the location where flight platform 110-1 is illustrated to be at), the disabled portions of the infrared camera may be functional again. In addition, some embodiments may determine when a flight platform and/or its attached infrared camera has entered a prohibited location (such as moving from the position of flight platform 110-1 to the position of flight platform 110-2) and may, upon such a determination, disable the attached infrared camera.

In accordance with embodiments described herein, infrared imaging system 100 may be configured to compensate for atmospheric interference between infrared camera 140 and a target in order to provide highly accurate and reliable radiometric thermal images of the target. Such atmospheric interference is typically not measureable when an infrared camera is less than approximately 5-10 meters from a target. However, when in flight, the distance between infrared camera 140 and target 450 (e.g., the radiance path length) can be 50-150 meters or more, and the atmospheric interference can be substantial (e.g., greater than 5% of the measured radiance or temperature). Accurate and reliable radiometric thermal images are particularly beneficial when monitoring farmland and/or operation of a mechanical or power generating installation, where relatively small changes in temperature over time (e.g., minutes, hours, days, weeks, months, or years), detected accurately, can significantly increase efficiency by minimizing unnecessary watering or maintenance and/or reduce operating costs due to inaccurately selected harvesting times or missed temperature indicated preventative maintenance.

FIG. 4 illustrates a diagram 400 of atmospheric interference and its effects on operation of infrared imaging system 100 in accordance with an embodiment of the disclosure. As shown in FIG. 4, target radiance 452 emitted by target 450 (e.g., the radiance that corresponds to the actual temperature of target 450) travels through atmosphere 460 and is partially attenuated or absorbed within atmosphere 460 and results in reduced target radiance 462 reaching infrared camera 140. Depending on the water content and the temperature of atmosphere 460, among other environmental conditions, the reduction in transmitted radiance can be approximately 5-20% at radiance path lengths approaching 150 meters.

Also shown in FIG. 4, background radiance 404 (e.g., from the sun, sky, other radiance sources) and atmospheric radiance 466 (e.g., self-radiance of atmosphere 460) can negatively impact the imagery captured by infrared camera 140. In FIG. 4, background radiance 404 impinges on the surface of target 450 that is being imaged by infrared camera 140, and causes reflected background radiance 454 to be directed towards infrared camera 140. The relative magnitude of reflected background radiance 454 depends on the emissivity of target 450. Reflected background radiance 454 is also partially attenuated/absorbed by atmosphere 460 and results in reduced reflected background radiance 464 reaching infrared camera 140, which can further skew any radiance measurement of target 450.

However, in addition, atmosphere 460 can self-radiate and produce atmospheric radiation 466, which can also further skew any radiance measurement of target 450. For example, if target 450 is a glass of ice water, and the current environmental conditions are a relatively hot and humid day, the reported temperature of target 450 may be elevated by more than 20 degrees C.

Figure 5:
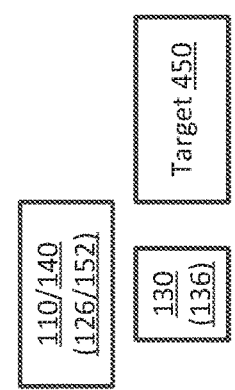
FIG. 5 illustrates a diagram of an infrared imaging system compensating for the atmospheric interference described with reference to FIG. 4, in accordance with an embodiment of the disclosure.

FIG. 5 illustrates a diagram 500 of infrared imaging system 100 compensating for the atmospheric and/or other interference described with reference to FIG. 4. FIG. 5 shows base station 130 and flight platform 110 (with camera 140) before flight platform has taken flight. Base station 130, flight platform 110, and/or infrared camera 140 may be implemented with a temperature sensor and/or a humidity sensor (e.g., other modules 126, 136, and/or 152), for example, and base station 130, flight platform 110, and/or infrared camera 140 may be configured to receive an air temperature and/or a relative humidity (e.g., before taking flight) and determine a function or look up table that provides a radiance (or temperature) adjustment to infrared images captured by infrared camera 140 as a function of distance to target 450 and/or altitude relative to 450. Subsequently, infrared imaging system 100 may be configured to use the distance and/or altitude dependent radiance adjustment to compensate for atmospheric interference when generating relatively accurate and reliable radiometric thermal images of target 450.

In some embodiments, base station 130 may receive (e.g., as user input) an estimated emissivity of target 450, for example, and based on an air temperature measured proximate to or at least approximately at the same altitude as target 450, include in the radiance adjustment a background radiance component configured to compensate for any portion of reflected background radiance 454 reaching infrared camera 140. In various embodiments, the background radiance component of the radiance adjustment may also be provided as a function of distance and/or altitude (e.g., due to atmospheric interference). In additional embodiments, infrared imaging system 100 may be implemented with a skyward aimed additional infrared camera and/or an irradiance detector (e.g., other modules 126), which can be configured to measure both the magnitude and a relative direction of background radiance 404 (e.g., relative to infrared camera 140 and/or the expected imaged surface of target 450). In such embodiments, the background radiance component of the radiance adjustment may be provided as a function of distance, relative altitude, and/or relative reflection angle (e.g., the angle(s) relative to background radiance 404 and target 450 at which (reduced) reflected background radiance 464 impinges on infrared camera 140). In some embodiments, an irradiance detector may be limited to a particular spectrum, for example, and in further embodiments, may be implemented similar to infrared camera 140.

Similarly, infrared imaging system 100 may be configured to use the air temperature measured before takeoff to estimate the temperature of atmosphere 460 and include in the radiance adjustment an atmospheric self-radiance component configured to compensate for any portion of atmospheric radiance 466 reaching infrared camera 140. In various embodiments, the atmospheric self-radiance component of the radiance adjustment may also be provided as a function of distance and/or altitude (e.g., due to expected temperature gradients in atmosphere 460).

In general, infrared imaging system 100 may be configured to receive measurements or user input indicating various environmental conditions (e.g., air temperature, relative humidity, emissivity of the target, background radiance, temperatures of portions of infrared camera 140, and/or other environmental conditions), potentially in combination with various manufacturer provided conversion functions (e.g., stored in memory 146), and then use the measurements or user input to generate a radiance or temperature adjustment that may be provided as a look up table or other function dependent upon the relative altitude of infrared camera 140, the distance to target 450, the direction and/or magnitude of background radiance 404, and/or states of flight platform 110 and/or infrared camera 140. For example, such radiance or temperature adjustment may be dynamically updated with newly measured environmental conditions as flight platform 110 moves about target 450.

Figure 6B:
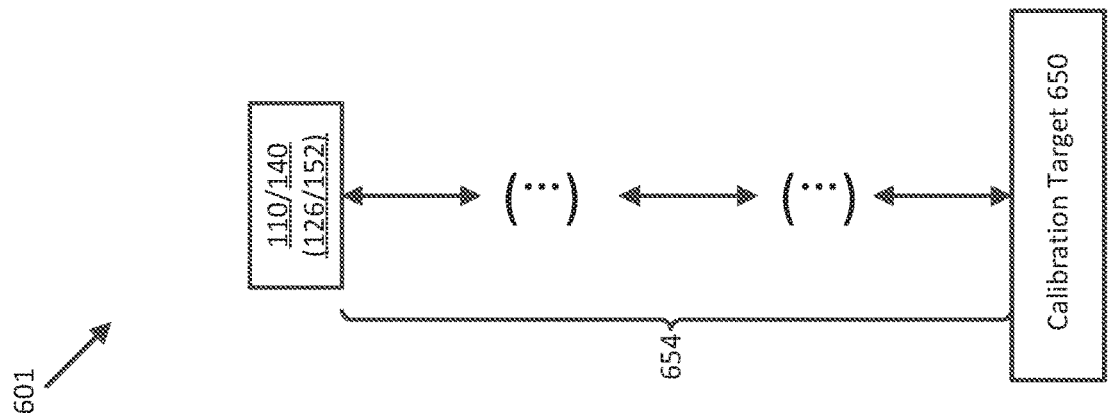
FIGS. 6A-B illustrate diagrams of an infrared imaging system compensating for the atmospheric and/or other interference described with reference to FIG. 4, in accordance with an embodiment of the disclosure.
Figure 6A:
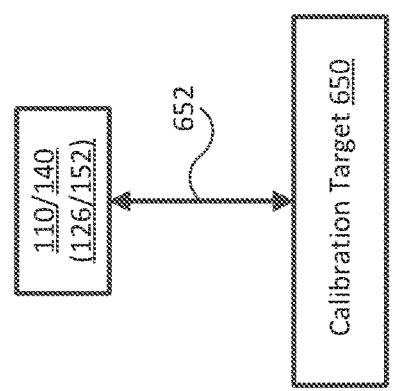

FIGS. 6A-B illustrate diagrams 600-601 of infrared imaging system 100 compensating for the atmospheric and/or other interference described with reference to FIG. 4. More specifically, FIGS. 6A-B illustrate flight platform 652 adjusting a relative altitude of infrared camera 140 above a calibration target 650 (e.g., a relatively large thermally uniform target, such as a parking lot) to generate a radiance or temperature adjustment as a function of relative altitude using a series of environmental measurements and infrared images taken at approximately the same time as the relative altitude is adjusted. Using the assumption that the atmospheric and/or other interferences are approximately zero at small relative altitudes, the magnitude of the various interferences can be measured directly as a function of altitude and then used to generate a direct radiance or temperature adjustment.

For example, FIG. 6A shows flight platform 110 (with camera 140) disposed above calibration target 650 at a relatively small relative altitude 652 (e.g., 1-5 meters). Infrared imaging system 100 may be configured to image calibration target 650 and/or measure an air temperature and/or relative humidity, among other environmental conditions, at small relative altitude 652, which may be defined as an altitude or range of altitudes where the atmospheric interference is less than or equal to 5% of the measured radiance of calibration target 650. Infrared imaging system 100 may be configured to use such measurements as a baseline with which to generate a direct radiance adjustment, as described herein. For example, controller 112 and/or base station 130 may be configured to determine a radiance adjustment associated with a target based, at least in part, on infrared image data of calibration target 650 (e.g., imaged at approximately the same time and/or under the same conditions as imaging a target, such as within the same image, or in different images captured within a few minutes of each other).

FIG. 6B shows flight platform 110 periodically stopping at different relative altitudes before reaching relatively large relative altitude 654, which may be defined as an altitude or range of altitudes where the atmospheric interference is greater than 5% (e.g., typically greater than 8%) of the measured radiance of calibration target 650. As described with reference to FIG. 5, flight platform 110 and/or infrared camera 140 may be configured to measure various environmental conditions (e.g., air temperature, relative humidity, background radiance (direction and/or magnitude), temperatures of portions of infrared camera 140, and/or other environmental conditions) at each different relative altitude, potentially in combination with various manufacturer provided conversion functions, and then use the measurements to generate a direct radiance or temperature adjustment that may be provided as a look up table or other function dependent upon the relative altitude of infrared camera 140, the distance to target 450, the direction and/or magnitude of background radiance 404, and/or states of flight platform 110 and/or infrared camera 140. Such lookup table or function may be used to extrapolate beyond relative altitude 654 to larger relative altitudes, for example.

In alternative embodiments, calibration target 650 may take the form of a vertical wall, for example, and flight platform 110 may be configured to generate a series of measurements by moving from a relatively close horizontal proximity to vertical calibration target 650 to a relatively far horizontal distance from vertical calibration target 650 (e.g., similar in length to relative altitudes 652 and 654), which can be used to estimate a direct radiance adjustment based on distance to calibration target 650 rather than a relative altitude. In such embodiments, the direct radiation adjustment may be further refined by applying an altitude correction factor (e.g., as a function of altitude) that helps compensate for altitude dependent environmental effects (e.g., due to change in temperature, relative humidity, and/or other environmental characteristics that can be modeled or statistically estimated and provided as a manufacturer supplied lookup table or function).

In various embodiments, flight platform 110 may include a range finder (e.g., a laser range finder) and/or a visible light laser pointer (e.g., other modules 126), configured to aim substantially at the same area as infrared camera 140 (e.g., at a central portion of an infrared image captured by infrared camera 140), for example, to provide an extremely accurate measure of a distance to target 450 and/or calibration target 650 or to provide a visible marker indicating where infrared camera 140 is aimed (e.g., an inexpensive embodiment of GNSS 118 may be used to provide a relatively rough measure of a distance to target 450 and/or calibration target 650). In various embodiments, such laser based devices may be configured to produce light that is detectable by infrared camera 140 or by an additional visible light camera (e.g., other modules 126) that is also configured to be aimed in substantially the same area (e.g., with at least partially overlapping FOVs) so as to provide positional feedback to controller 112 and/or a user of base station 130. For example, infrared imaging system 100 may be configured to mark or "paint" with visible laser light one or more portions of target 450 that are above or below a predetermined or set temperature threshold or temperature excursion, for example. In alternative embodiments, base station 130 may include a laser pointer that can be used to mark a particular target, and flight platform 110 may be configured to detect the mark and image one or more views of the marked target with infrared camera 140.

The different methods of generating the radiance adjustment, described with reference to at least FIGS. 5-6B, and/or portions of the different methods, may be used interchangeably with each other to help refine the radiance adjustment and provide a reliable and accurate radiometric thermal image of target 450, as described herein.

Figure 7:
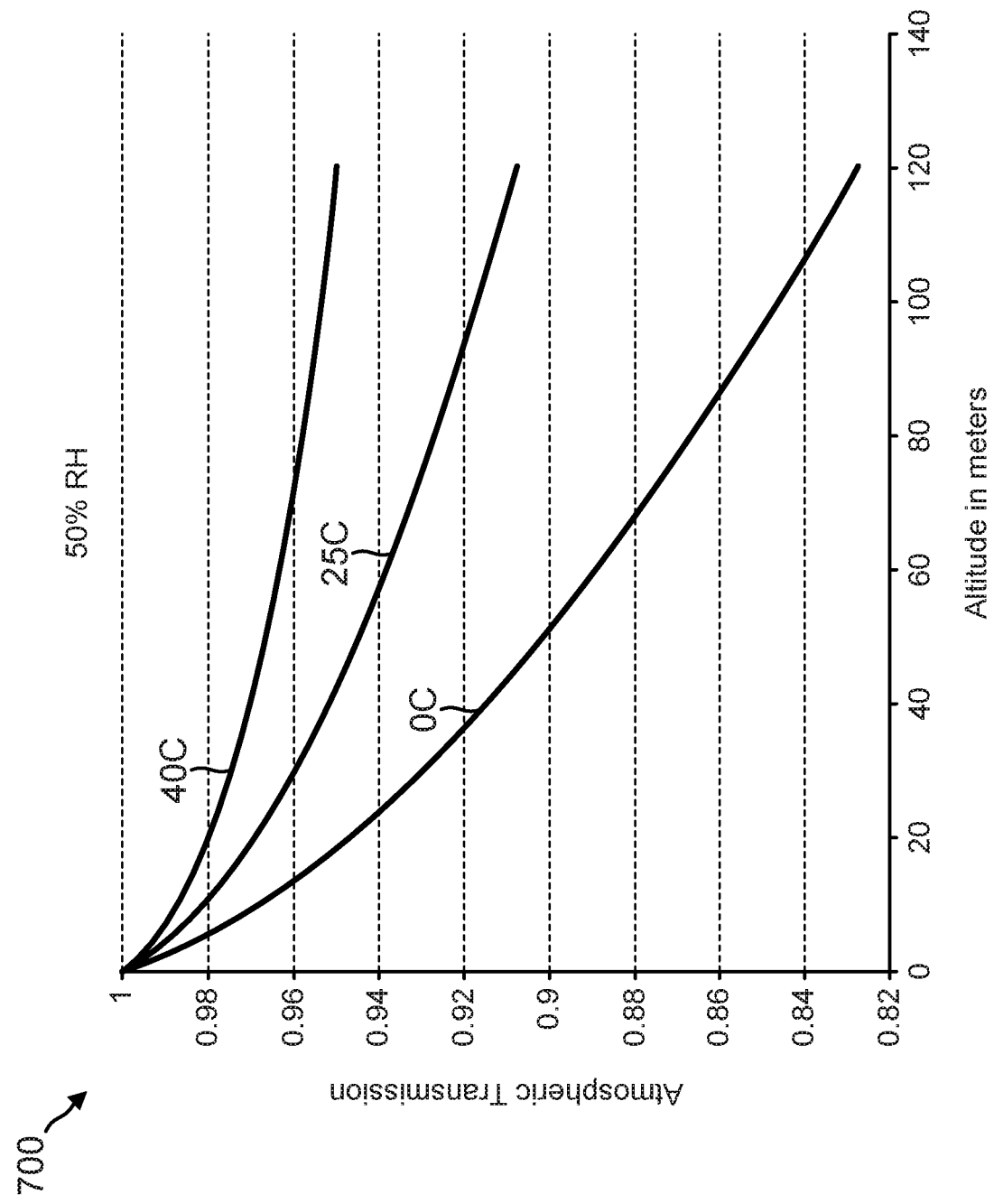
FIG. 7 illustrates a graph of atmospheric interference at a set relative humidity for various temperatures as a function of altitude in accordance with an embodiment of the disclosure.

FIG. 7 illustrates a graph 700 of atmospheric interference at a set relative humidity of 50% for various temperatures (0, 25, and 40 degrees C.) as a function of altitude in accordance with an embodiment of the disclosure. As can be seen from FIG. 7, just atmospheric absorption component of the atmospheric interference can be greater than 5% at relative altitudes as small as 20 meters.

Figure 8:
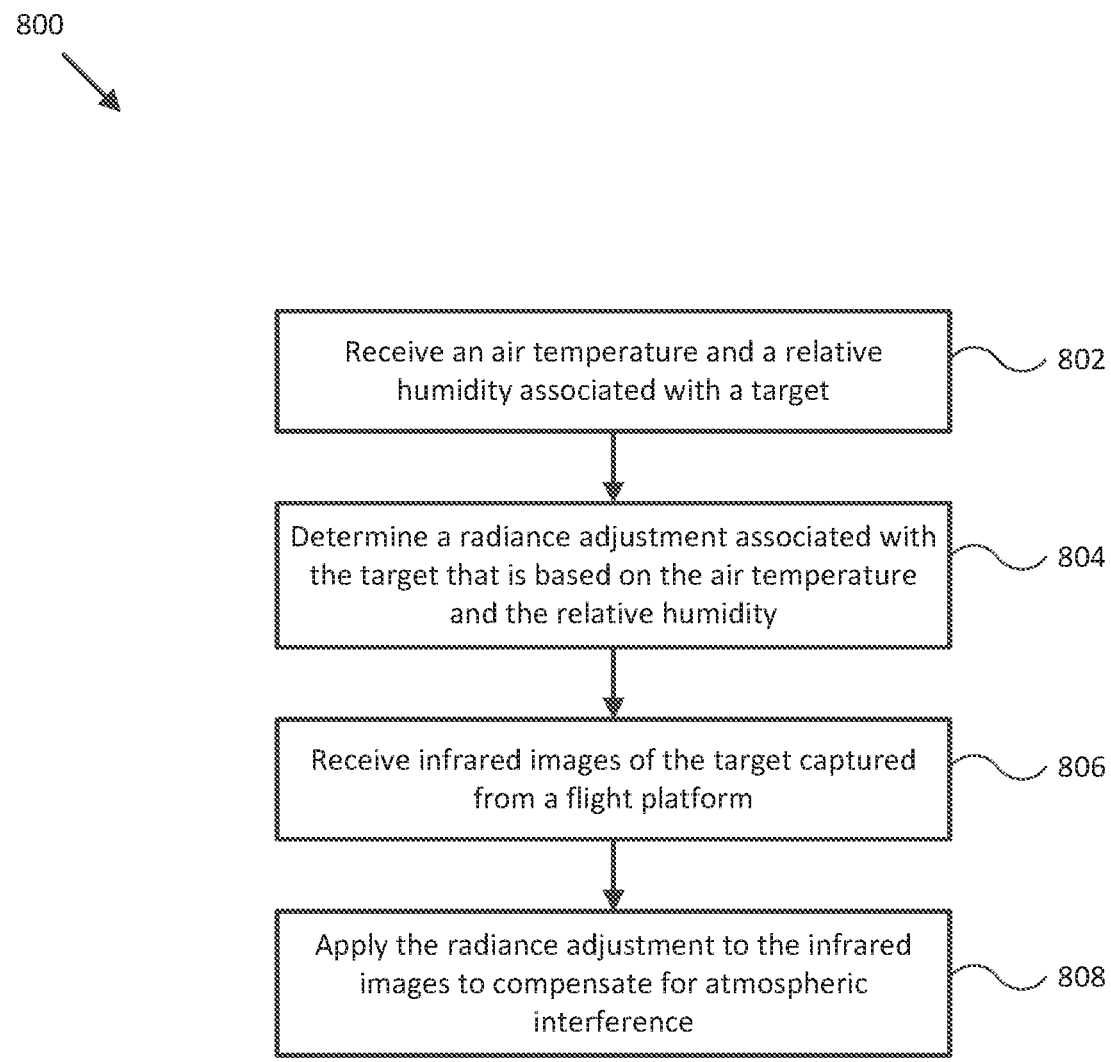
FIG. 8 illustrates a flow diagram of various operations to operate an infrared imaging system in accordance with an embodiment of the disclosure.

FIG. 8 illustrates a flow diagram 800 of various operations to operate infrared imaging system 100 in accordance with an embodiment of the disclosure. In some embodiments, the operations of FIG. 8 may be implemented as software instructions executed by one or more logic devices associated with corresponding electronic devices, sensors, and/or structures depicted in FIGS. 1-2. More generally, the operations of FIG. 8 may be implemented with any combination of software instructions and/or electronic hardware (e.g., inductors, capacitors, amplifiers, actuators, or other analog and/or digital components).

It should also be appreciated that any step, sub-step, sub-process, or block of process 800 may be performed in an order or arrangement different from the embodiments illustrated by FIG. 8. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 800 is described with reference to systems described in FIGS. 1-2, process 800 may be performed by other systems different from those systems and including a different selection of electronic devices, sensors, assemblies, mobile structures, and/or mobile structure attributes.

At block 802, an air temperature and/or a relative humidity associated with a target are received. For example, controller 112 may be configured to receive an air temperature and/or a relative humidity measurement that is associated with target 450 from a temperature sensor and/or a humidity sensor (e.g., other modules 126) of flight platform 110. Such air temperature and/or relative humidity measurement may be associated with target 450 by being measured proximate to an area near target 450 and/or at an altitude approximately the same as that for target 450. In some embodiments, other environmental characteristics may be measured and/or input by a user.

At block 804, a radiance adjustment associated with a target and based on an air temperature and/or a relative humidity is determined. For example, controller 112 may be configured to determine a radiance adjustment associated with target 450 and based on the air temperature and/or a relative humidity measurement received from other modules 126 in block 802. In some embodiments, the radiance adjustment may compensate primarily for atmospheric interference, as described herein. In other embodiments, the radiance adjustment may be based on various additional environmental characteristics and compensate for other environmental interference, such as atmospheric self-emission, background reflection radiance, and/or other detrimental environmental effects, as described herein.

At block 806, infrared images of a target captured from a flight platform are received. For example, controller 112 may be configured to receive infrared images from infrared camera 140 coupled to flight platform 110. In various embodiments, flight platform 110 may be in flight over or near target 450 and be configured to aim infrared camera 140 to image target 450.

At block 808, a radiance adjustment is applied to infrared images to compensate for atmospheric interference. For example, controller 112 may be configured to apply the radiance adjustment determined in block 804 to the infrared images received in block 806 to compensate for atmospheric interference between infrared camera 140 and target 450 and/or for other types of interference and/or environmental effects, as described herein.

In accordance with embodiments described herein, infrared imaging system 100 may be configured to inspect and/or monitor a solar power array, other power generating structures, and/or other structures. Because infrared imaging system 100 can provide highly accurate and reliable radiometric thermal images of such power generating structures, embodiments are able to help increase efficiency by reliably and accurately pinpointing inefficient (e.g., dirty) and/or malfunctioning solar panels or solar panel structures (e.g., structures within the individual solar panels) and by minimizing otherwise unnecessary maintenance and/or by reducing operating costs due to missed temperature indicated preventative maintenance.

Figure 9:
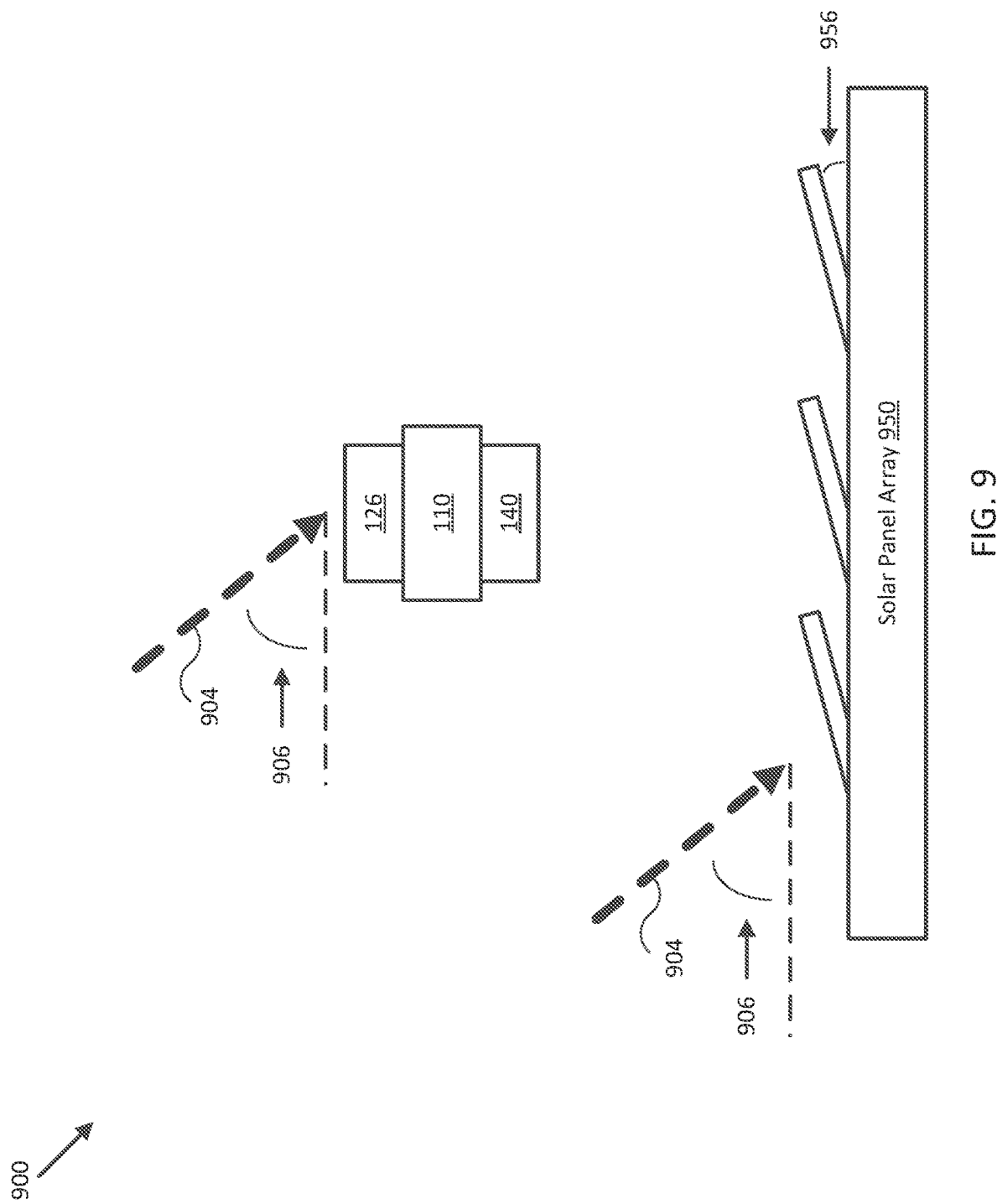
FIG. 9 illustrates a diagram of an infrared imaging system monitoring a structure, in accordance with an embodiment of the disclosure.

FIG. 9 illustrates a diagram 900 of infrared imaging system 100 monitoring a solar panel array 950, in accordance with an embodiment of the disclosure. As shown in FIG. 9, infrared imaging system 100 includes flight platform 100 implemented with infrared camera 140 imaging solar panel array 950 and an upward facing irradiance detector (e.g., other modules 126) configured to measure a magnitude and/or a direction of background radiance 904 (e.g., shown in FIG. 9 impinging irradiance detector 126 and solar panel array 950). Infrared imaging system 100 may be configured to use the magnitude and/or direction of background radiance 904 to provide an accurate measure of the operational efficiency of solar panel array 950.

For example, in one embodiment, infrared imaging system 100 may be configured to use the measured background radiance 904 to compensate for an emissivity of and/or a reflected background radiance provided by solar panel array 950. In some embodiments, infrared imaging system 100 may be configured to subtract the expected reflected background radiance (e.g., based on the measured magnitude of background radiance 904 and/or a combination of angle of incidence 906, solar panel angle 956, and/or a relative position and/or orientation of infrared camera 140) from infrared images captured by infrared camera 140 to produce radiometric thermal images of solar panel array 950. In various embodiments, infrared imaging system 100 may be configured to change a position and/or orientation of flight platform 110 and/or infrared camera 140 to reduce a reflected background radiance (e.g., by moving out of a direct reflection of a localized source of background radiation, such as the sun, from solar panel array 950).

In another embodiment, infrared imaging system 100 may be configured to use the measured background radiance 904 to determine an expected thermal profile for solar panel array 950 (e.g., including individual panels and/or panel structures), based on the expected conversion rate of incident radiance to output energy, for example, and to detect absolute quantitative deviations from the expected thermal profile (e.g., as opposed to more qualitative relative thermal differences). For example, system 100 may be configured to determine thermal profiles for individual panels of solar panel array 950 based, at least in part, on an expected conversion rate of incidence radiance to output energy (e.g., as input by a user and/or transmitted by base station 130) and measured background radiance from irradiance detector 126.

In a further embodiment, infrared imaging system 100 may be configured to use the measured background radiance 904 to determine an estimated emissivity for solar panel array 950 (e.g., including individual panels and/or panel structures), based on the measured background radiance and an estimated or measured reflected radiance from a functioning portion of solar panel array 950 (e.g., as determined by other measured characteristics, including thermal characteristics). Such estimated emissivity may be used to characterize a surface of an imaged target, such a solar panel array 950, a structure roof, a tarmac, a surface of an aircraft, and/or other surfaces of an imaged target.

In addition, any of the methods described herein to compensate for atmospheric and/or other interference may be used in combination with the methods described with reference to FIG. 9 to help reduce such errors in resulting radiometric thermal images of solar panel array 950.

By providing highly accurate and reliable (e.g., reproducible) radiometric thermal images of targets, embodiments of the present disclosure enable airborne inspection and monitoring techniques that are significantly more utilitarian than conventional techniques. For example, embodiments of infrared imaging system 100 may be configured to image a roof of a structure and determine, based on temperature differences across the surface of the roof that are detectable using techniques disclosed herein, that portions of the roof are compromised and exhibit moisture saturation above that acceptable for a thermally efficient and weatherproof roof. Such measurements may include an estimation of an emissivity of an imaged surface of a target (e.g., such as a roof or solar panel array 950) based on a measured background radiance and an infrared image of the target. For example, for some materials, a relatively low emissivity estimation may indicate moisture saturation, whereas a relatively high emissivity estimation may indicate moisture beading.

Figure 10:
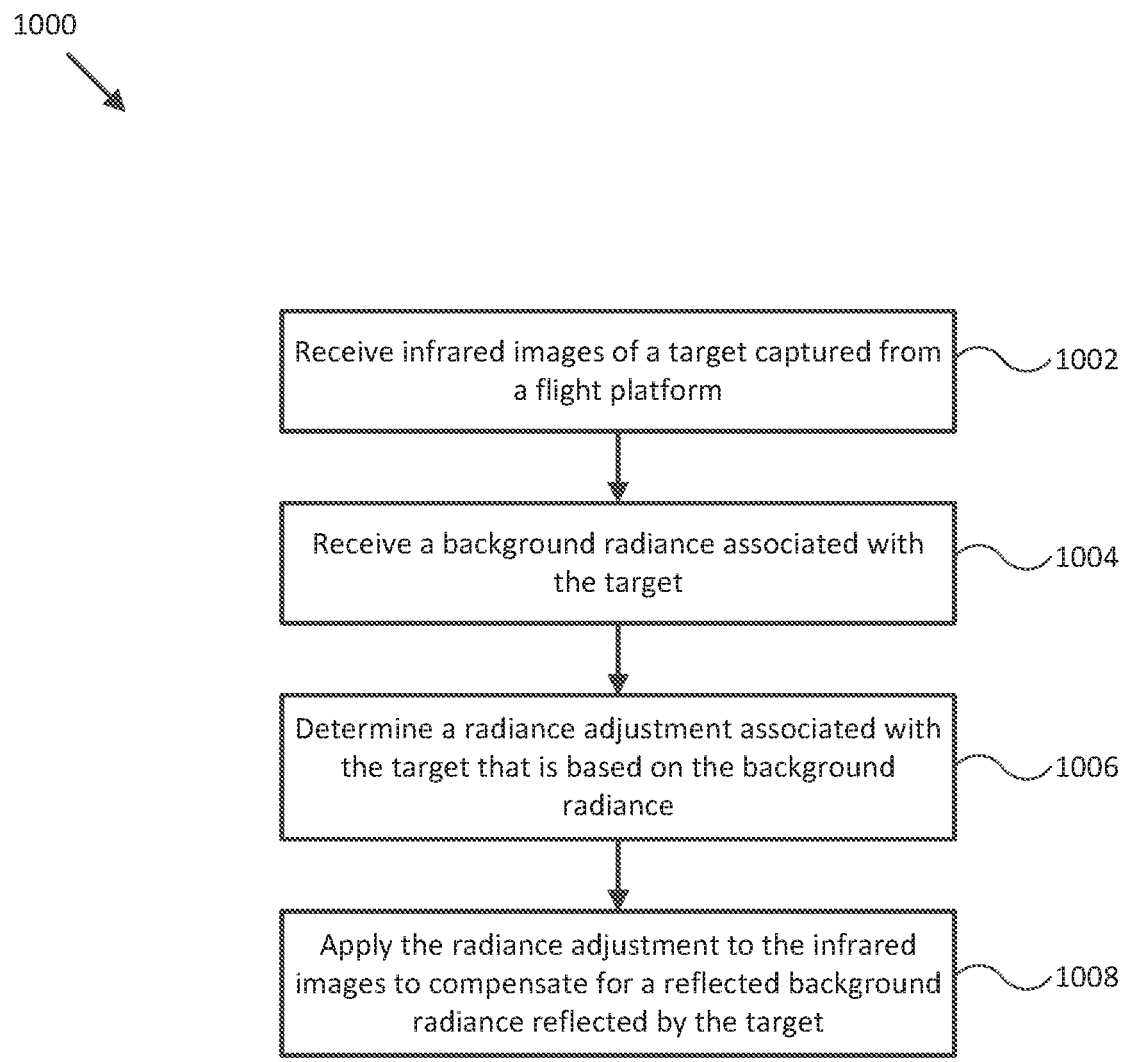
FIG. 10 illustrates a flow diagram of various operations to operate an infrared imaging system in accordance with an embodiment of the disclosure.

FIG. 10 illustrates a flow diagram 1000 of various operations to operate infrared imaging system 100 in accordance with an embodiment of the disclosure. In some embodiments, the operations of FIG. 10 may be implemented as software instructions executed by one or more logic devices associated with corresponding electronic devices, sensors, and/or structures depicted in FIGS. 1-2. More generally, the operations of FIG. 10 may be implemented with any combination of software instructions and/or electronic hardware (e.g., inductors, capacitors, amplifiers, actuators, or other analog and/or digital components).

It should also be appreciated that any step, sub-step, sub-process, or block of process 1000 may be performed in an order or arrangement different from the embodiments illustrated by FIG. 10. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 1000 is described with reference to systems described in FIGS. 1-2, process 1000 may be performed by other systems different from those systems and including a different selection of electronic devices, sensors, assemblies, mobile structures, and/or mobile structure attributes.

At block 1002, infrared images of a target captured from a flight platform are received. For example, controller 112 may be configured to receive infrared images of target/solar panel array 950 from infrared camera 140 coupled to flight platform 110. In various embodiments, flight platform 110 may be in flight over or near target 950 and be configured to aim infrared camera 140 to image target 950.

At block 1004, a background radiance associated with a target is received. For example, controller 112 may be configured to receive a background radiance measurement associated with target 950 from an irradiance detector (e.g., other modules 126) of flight platform 110. Such background radiance measurement may be associated with target 950 by being measured proximate to an area near target 950 and/or at an altitude approximately the same as that for target 950. In some embodiments, other environmental characteristics may be measured and/or input by a user.

At block 1006, a radiance adjustment associated with a target and based on a background radiance is determined. For example, controller 112 may be configured to determine a radiance adjustment associated with target 950 and based on the radiance measurement received from other modules 126 in block 1004. In some embodiments, the radiance adjustment may compensate primarily for reflected background radiance, as described herein. In other embodiments, the radiance adjustment may be based on various additional environmental characteristics and compensate for other environmental interference, such as atmospheric interference, atmospheric self-emission, background reflection radiance, and/or other detrimental environmental effects, as described herein.

At block 1008, a radiance adjustment is applied to infrared images to compensate for a reflected background radiance reflected by the target. For example, controller 112 may be configured to apply the radiance adjustment determined in block 1006 to the infrared images received in block 1002 to compensate for reflected background radiance reflected by target 950 towards infrared camera 140 and/or to compensate for other types of interference and/or environmental effects, as described herein.

Additional steps and/or substeps may be incorporated into process 1000. For example, flight platform 110 may be implemented with irradiance detector 126 on top and infrared camera 140 facing down, and flight platform 110 may be configured to fly to a relative altitude sufficiently high to capture all of solar panel array 950 in a single image, which can be used (e.g., with position data provided by GNSS 118) to map solar panel array 950 and/or individual panels or structures of solar panel array 950 (e.g., relative to each other or a chart or geographical map of the location of solar panel array 950). In some embodiments, the geographical expanse of such an image may be limited, such as to limit distance based loss of detail in resultant radiometric thermal images. Infrared imaging system 100 may be configured to identify each panel in the resulting image, such as by a provided mapping of identification numbers for panels of solar panel array 950.

After such mapping, flight platform 110 may be configured to reduce an altitude or otherwise adjust a position of infrared camera 140 to allow for relatively high resolution/detail inspection of individual panels of solar panel array 950.

Infrared imaging system 100 may be configured to analyze resulting radiometric thermal images for system malfunctions and/or inefficiencies by generating a histogram over a portion of solar panel array 950 or by using pattern analysis (e.g., based on thermal differences) applied to images of panels of solar panel array 950 to detect system malfunctions and/or inefficiencies and/or to estimate overall system operational efficiency.

In alternative embodiments, flight platform 110 may be implemented with irradiance detector 126 on top and infrared camera 140 facing down, and flight platform 110 may be configured to fly a grid pattern over solar panel array 950 while capturing infrared images of solar panel array 950 to generate an ortho-mosaic image of solar panel array 950. Such ortho-mosaic image can be used (e.g., correlated with position data provided by GNSS 118) to map solar panel array 950 and/or individual panels or structures of solar panel array 950 (e.g., relative to each other or a chart or geographical map of the location of solar panel array 950). Infrared imaging system 100 may be configured to identify each panel in the resulting ortho-mosaic image, such as by a provided mapping of identification numbers for panels of solar panel array 950.

After such mapping, flight platform 110 may be configured to reduce an altitude or otherwise adjust a position of infrared camera 140 to allow for relatively high resolution/detail inspection of individual panels of solar panel array 950 and corresponding radiometric thermal image histogram analysis, pattern analysis, and/or other image or structure analysis, as described herein. Such analysis may include pattern recognition and/or reporting of a percentage of array not performing according to a set or provided operating characteristic.

As noted herein, determining incidence angle 904 of background radiance (e.g., the angle of the sun relative to an orientation of infrared camera 140) can be critical to compensating for reflected background radiance. Glare or glint from the sun can degrade an irradiance measurement and any infrared images of solar panel array 950. In some embodiments, to help determine such angle(s), flight platform 110 may be implemented with multiple irradiance detectors aimed at different angles relative to flight platform 110 and/or infrared camera 140. In other embodiments, the time of day and absolute position and/or orientation of infrared camera 140 may be determined or measured and recorded with each captured infrared image and/or background irradiance measurement to allow post-capture calculation of angle 904.

In additional embodiments, a series of infrared images captured by infrared camera 140 may be analyzed to detect image artifacts and/or anomalies during flight that do not move relative to the image frame border; moving anomalies likely result from glint and can be compensated for or removed from analysis, non-moving anomalies likely indicate problem areas with solar panel array 950 that should be investigated further. In various embodiments, multiple time lapsed flights of flight platform 110 may be performed to allow for time differentiated comparisons of panels of solar panel array 950, which can be used to track degradation over time and indicate preemptive maintenance.

Although described herein the context of solar panel inspection, other structures and/or contexts are contemplated, such as cattle herd tracking (e.g., position and/or heath), mining inspection, chemical spill survey, large distribution pipe inspection, habitat survey, marine turtle breeding sites, alligator nest mapping, precision agriculture, and/or other contexts that benefit from highly accurate and/or reliable (e.g., repeatable) radiometric thermal image analysis, as described herein.

In accordance with embodiments described herein, infrared imaging system 100 may be configured to inspect and/or monitor power distribution lines and/or other structures, such as power distribution systems (e.g., lines, transformers, support structures, and/or other components of power distribution systems) providing power to or from power generating structures or systems, including solar panel array 950. Because infrared imaging system 100 can provide highly accurate and reliable radiometric thermal images of such power distribution systems, embodiments are able to help increase efficiency by reliably and accurately pinpointing damaged and/or malfunctioning power distribution system components and by minimizing otherwise unnecessary maintenance and/or by reducing operating costs due to missed temperature indicated preventative maintenance.

Figure 11:
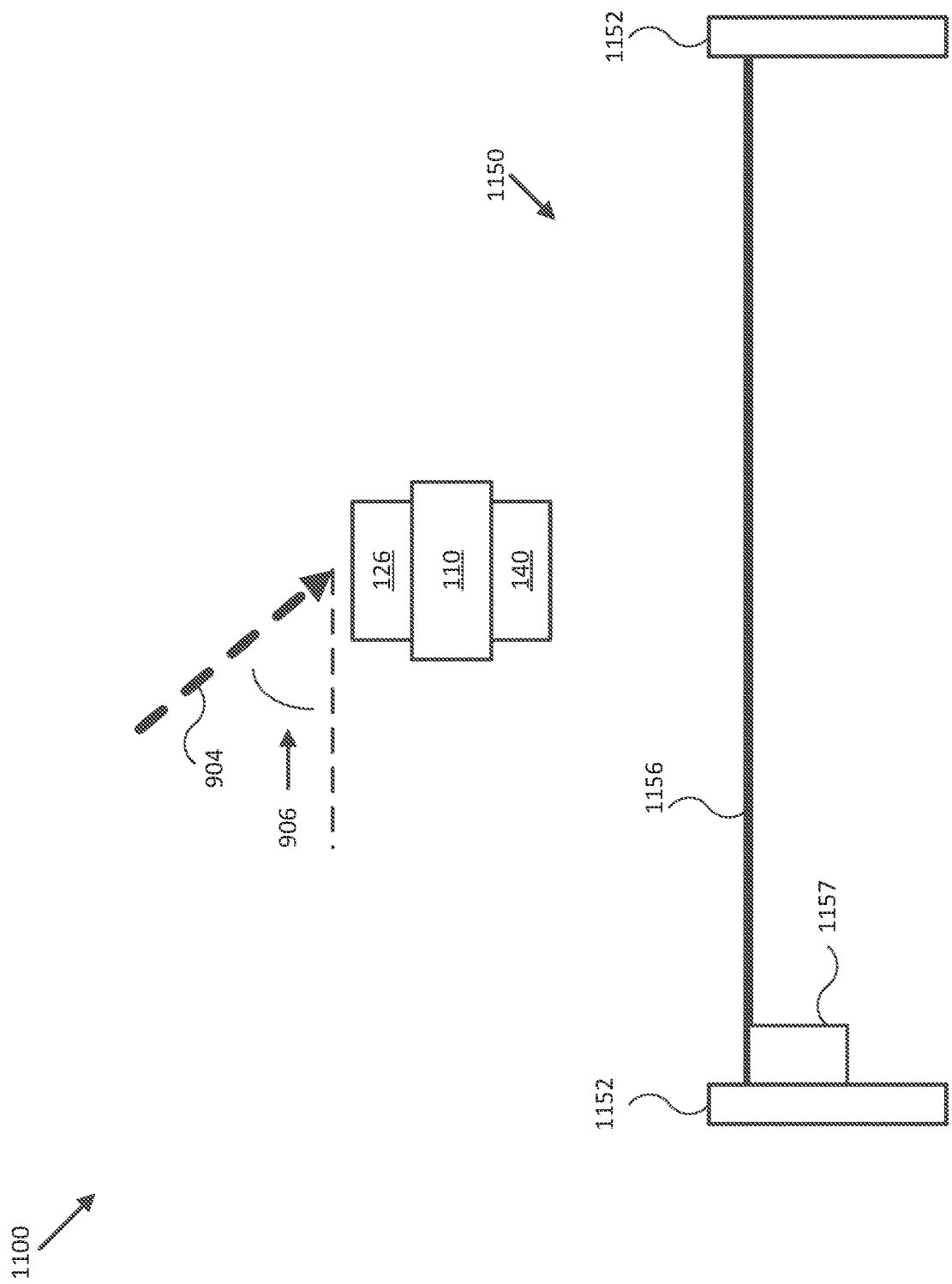
FIG. 11 illustrates a diagram of an infrared imaging system monitoring a structure, in accordance with an embodiment of the disclosure.

FIG. 11 illustrates a diagram 1100 of infrared imaging system 100 monitoring a power distribution system 1150, in accordance with an embodiment of the disclosure. As shown in FIG. 11, infrared imaging system 100 includes flight platform 100 implemented with infrared camera 140 imaging power distribution system 1150 and an upward facing irradiance detector (e.g., other modules 126) configured to measure a magnitude and/or a direction of background radiance 904. Infrared imaging system 100 may be configured to use the magnitude and/or direction of background radiance 904 to provide an accurate measure of the operational efficiency of power distribution system 1150 and/or powerline 1156, power transformer 1157, and/or supports (e.g., poles) 1152.

For example, in one embodiment, infrared imaging system 100 may be configured to use the measured background radiance 904 to compensate for an emissivity of and/or a reflected background radiance provided by one or more of powerline 1156, power transformer 1157, and/or supports 1152. In some embodiments, infrared imaging system 100 may be configured to subtract the expected reflected background radiance (e.g., based on the measured magnitude of background radiance 904 and/or a combination of angle of incidence 906, and angle associated with surfaces of powerline 1156, power transformer 1157, and/or supports 1152, and/or a relative position and/or orientation of infrared camera 140) from infrared images captured by infrared camera 140 to produce radiometric thermal images of power distribution system 1150. In various embodiments, infrared imaging system 100 may be configured to change a position and/or orientation of flight platform 110 and/or infrared camera 140 to reduce a reflected background radiance (e.g., by moving out of a direct reflection of a localized source of background radiation, such as the sun, from power distribution system 1150).

In another embodiment, infrared imaging system 100 may be configured to use the measured background radiance 904 to determine an estimated emissivity for power distribution system 1150 (e.g., including individual power distribution lines 1156, power transformers 1157, and/or supports 1152), based on the measured background radiance and an estimated or measured reflected radiance from a functioning portion of power distribution system 1150 (e.g., as determined by other measured characteristics, including thermal characteristics). Such estimated emissivity may be used to characterize a surface of an imaged target, such as power distribution system 1150, powerline 1156, power transformer 1157, supports 1152, and/or other surfaces of an imaged target. In addition, any of the methods described herein to compensate for atmospheric and/or other interference may be used in combination with the methods described with reference to FIG. 11 to help reduce such errors in resulting radiometric thermal images of power distribution system 1150.

By providing highly accurate and reliable (e.g., reproducible) radiometric thermal images of targets, embodiments of the present disclosure enable airborne inspection and monitoring techniques that are significantly more utilitarian than conventional techniques. For example, embodiments of infrared imaging system 100 may be configured to image powerline 1156 and determine, based on temperature differences across the surface of powerline 1156 that are detectable using techniques disclosed herein, that portions of powerline 1156 (e.g., splices, joints, and/or other discontinuities in powerline 1156) are compromised and exhibit thermal gradients above that acceptable for a thermally and electrically efficient and weatherproof powerline, transformer, support, and/or other component of a power distribution system. Such measurements may include an estimation of an emissivity of an imaged surface of a target based on a measured background radiance and an infrared image of the target. For example, for some materials, a relatively low emissivity estimation may indicate moisture saturation, whereas a relatively high emissivity estimation may indicate moisture beading.

Figure 12:
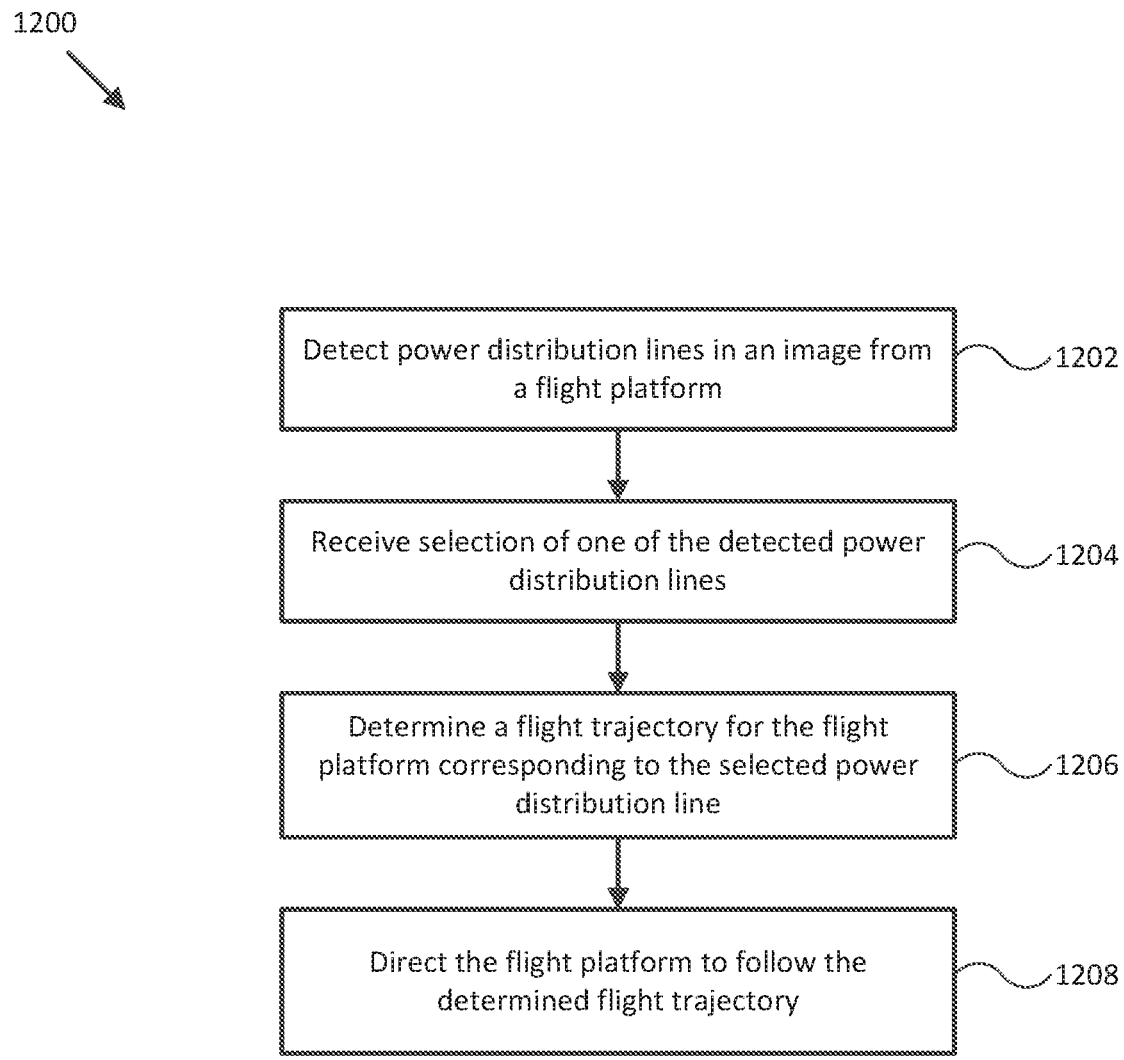
FIG. 12 illustrates a flow diagram of various operations to operate an infrared imaging system in accordance with an embodiment of the disclosure.

FIG. 12 illustrates a flow diagram 1200 of various operations to operate infrared imaging system 100 in accordance with an embodiment of the disclosure. In some embodiments, the operations of FIG. 12 may be implemented as software instructions executed by one or more logic devices associated with corresponding electronic devices, sensors, and/or structures depicted in FIGS. 1-2. More generally, the operations of FIG. 12 may be implemented with any combination of software instructions and/or electronic hardware (e.g., inductors, capacitors, amplifiers, actuators, or other analog and/or digital components).

It should also be appreciated that any step, sub-step, sub-process, or block of process 1200 may be performed in an order or arrangement different from the embodiments illustrated by FIG. 12. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 1200 is described with reference to systems described in FIGS. 1-2, process 1200 may be performed by other systems different from those systems and including a different selection of electronic devices, sensors, assemblies, mobile structures, and/or mobile structure attributes.

At block 1202, power distribution lines in an image received from a flight platform are detected. For example, controller 112 and/or base station 130 may be configured to receive infrared images of target/powerline 1156 from infrared camera 140 coupled to flight platform 110, and/or to receive visible spectrum images from a visible spectrum imaging module/camera (e.g., other modules 126/152) coupled to flight platform 110. In some embodiments, flight platform 110 may be in flight over or near target 1156 and be configured to aim infrared camera 140 to image target 1156. In other embodiments, flight platform 110 may be in flight over or near multiple power distribution lines 1156. In various embodiments, flight platform 110 may be piloted by a user (e.g., using user interface 132 of base station 130) or may be in a search mode, such as following a search grid configured to survey a selected area for power distribution lines and/or other components of a power distribution system. In such embodiments, a flight platform 110 may be flown at an appropriate altitude over such components such that the components are fully in an associated field of view, there is sufficient detail to detect the components, and flight platform 110 is flows safely above or near the components. Received infrared images may be processed and/or corrected according to a radiance adjustment determined according to the methods described herein, before being processed to detect targets.

Once an image of targets 1156 is received and/or processed, controller 112 may be configured to detect or identify individual targets in the received image. In embodiments where targets 1156 are power distribution lines, such targets may look substantially like straight lines extending through the image (e.g., as adjusted for optical aberrations introduced by associated imaging optics, such as wide angle lenses, etc.). Methods to detect power distribution lines in infrared and/or visible spectrum images may include applying a Hough Transform or a Radon Transform to a received image to identify all power distribution lines within the received image, for example, and/or to identify characteristics of the identified power distribution lines, such as a nearest range to a power distribution line, a relative or absolute orientation of the power distribution line (e.g., along its length), and/or other power distribution line characteristics. In some embodiments, controller 112 may be configured to transmit an image of target 1156, and/or associated detected characteristics, to base station 130 upon detecting one or more targets 1156 in a received image. In other embodiments, controller 112 may be configured to transmit a series of images to base station 130, and base station 130 may be configured to detect target 1156 and/or determine characteristics of target 1156 based on the received images.

At block 1204, a selection of one of the power distribution lines detected in block 1202 is received. For example, controller 112 and/or base station 130 may be configured to receive user selection of one power distribution line of a group of power distribution lines detected in block 1202. In one embodiment, a user may view an image of one or more targets 1156 using a display of user interface 130, for example, and provide user input (e.g., mouse click, finger press, joystick cursor movement and selection, and/or other user input) selecting one of the displayed targets 1156. In other embodiments, controller 112 and/or base station 130 may be configured to select one target 1156 out of a group of targets 1156, such as the nearest target, a target with a preferred trajectory, a target with the highest measured temperature, a labeled target (e.g., a target with a painted on label or similar, detected as part of block 1202). In further embodiments, multiple targets 1156 may be selected, such as power distribution lines that are similarly oriented and spatially within a field of view of infrared camera 140, for example, and that can be monitored using a single series of images, as described herein.

At block 1206, a flight trajectory for a flight platform corresponding to the power distribution line selected in block 1204 is determined. For example, controller 112 and/or base station 130 may be configured to determine a flight trajectory for flight platform 110 substantially to follow along power distribution line 1156, so as to keep power distribution line 1156 in a field of view of imaging module 142 and/or other imaging modules so that multiple and/or a series of infrared and/or visible spectrum images of power distribution line 1156 may be captured and analyzed for damage and/or other maintenance concerns. In some embodiments, controller 112 and/or base station 130 may be configured to receive (e.g., as user input) or determine a maximum distance over which to follow or track target 1156. For example, controller 112 and/or base station 130 may be configured to determine a safe tracking distance (e.g., length of tracking a particular target) based on a remaining known or estimated battery capacity, the requirement for a round trip flight trajectory, the requirement to keep flight platform in view of a user and/or in transmission range of base station 130, and/or other flight platform and/or user constraints. A relative distance and/or image orientation between flight platform 130 and target 1156 may be set by user input and/or by controller 112 and/or base station 130 according to safety requirements and/or a desired resolution/perspective of inspection images of target 1156.

At block 1208, flight platform 110 is directed to follow the flight trajectory determined in block 1206. For example, controller 112 and/or base station 130 may be configured to control flight platform 110 to follow the flight trajectory (e.g., velocity, altitude, and/or other flight trajectory characteristics) determined in block 1206. In various embodiments, controller 112 and/or base station 130 may be configured to orient flight platform 110 such that a field of view of imaging module 142 includes a portion of target 1156, and to control imaging module 142 to capture a series of images of target 1156 encompassing a substantially continuous length of target 1156. Such images may be stored in memory, for example, and/or transmitted to base station 130 for in-flight viewing by a user of system 100.

In some embodiments, such series of images (e.g., infrared/thermal images, and/or visible spectrum images) may be transmitted and/or stored based on one or more temperature thresholds associated with a measured temperature of a portion of target 1156. For example, controller 112 and/or base station 130 may be configured to start or stop and/or store a series of images of power distribution line 1156 based on a temperature of a portion of power distribution line 1156 exceeding a preset temperature threshold, for example, or based on a detected temperature excursion outside a preset temperature range, which in some embodiments may be preset by a user.

In a specific embodiment, controller 112 and/or base station 130 may be configured to determine/measure a series of temperatures (e.g., derived from corresponding infrared images) of portions of target 1156 according to a bounding box (e.g., with pixel and/or absolute dimensions set by a user and/or automatically based on a detected extent of target 1156) moved across a length of target 1156 according to the determined flight trajectory, and to detect temperature gradients and/or maximums or minimums across the length of target 1156 based on the series of measured temperatures. The detected temperature gradients, maximums, and/or minimums may be compared to corresponding threshold gradients, maximums, and/or minimums to determine corresponding temperature excursions beyond such thresholds, and the detection of such excursions may trigger starting/stopping/storing the series of images, for example, and/or provide an alert to a user. Stored images and/or series of images would be stored with the absolute position and/or orientation of flight platform 110, infrared camera 140, and/or the imaged portion of target 1156 (e.g., the absolute position and/or orientation corresponding to the store images) as provided by, for example, orientation sensor 114 and/or GNSS 118, to allow a user to coordinate repairs of detected damage or other issues.

In some embodiments, target detection (e.g., block 1202) may be more robust using visible spectrum images or combined images as compared to infrared/thermal images (e.g., when a power distribution system is not energized), or vice versa. Controller 112 and/or base station 130 may be configured to automatically select visible spectrum images, infrared images, and/or combined images on which to perform block 1202, for example, based on ambient light, temperature, and/or other environmental states. In some embodiments, controller 112 and/or base station 130 may be configured to process multiple different spectral types of images to detect targets 1156 and compare the different detection results to produce a superset of target detections and/or to reduce a risk of false positive detections. In additional embodiments, controller 112 and/or base station 130 may be configured to pilot flight platform 110 and/or to orient an actuated mount or gimbal of infrared camera 140 to reduce a risk of capturing images of targets 1156 including detrimental solar features and/or reflections, as described herein. In various embodiments, base station 130 may be configured to receive a series of images and render them on a display (e.g., user interface 132) for a user.

Additional steps and/or substeps may be incorporated into process 1200. For example, flight platform 110 may be implemented with irradiance detector 126 on top and infrared camera 140 facing down, and flight platform 110 may be configured to fly to a relative altitude sufficiently high to capture all of power distribution system 1150 in a single image, which can be used (e.g., with position data provided by GNSS 118) to map power distribution system 1150 and/or individual components or structures of power distribution system 1150 (e.g., relative to each other on a chart or geographical map of the location of power distribution system 1150). In some embodiments, the geographical expanse of such an image may be limited, such as to limit distance based loss of detail in resultant radiometric thermal images. Infrared imaging system 100 may be configured to identify each component in the resulting image, such as by a provided mapping of identification numbers for panels of power distribution system 1150.

After such mapping, flight platform 110 may be configured to reduce an altitude or otherwise adjust a position of infrared camera 140 to allow for relatively high resolution/detail inspection of individual panels of power distribution system 1150. Infrared imaging system 100 may be configured to analyze resulting radiometric thermal images for system malfunctions and/or inefficiencies by generating a histogram over a portion of power distribution system 1150 or by using pattern analysis (e.g., based on thermal differences) applied to images of components of power distribution system 1150 to detect system malfunctions and/or inefficiencies and/or to estimate overall system operational efficiency.

In alternative embodiments, flight platform 110 may be implemented with irradiance detector 126 on top and infrared camera 140 facing down, and flight platform 110 may be configured to fly a grid pattern over power distribution system 1150 while capturing infrared images of power distribution system 1150 to generate an ortho-mosaic image of power distribution system 1150. Such ortho-mosaic image can be used (e.g., correlated with position data provided by GNSS 118) to map power distribution system 1150 and/or individual components or structures of power distribution system 1150 (e.g., relative to each other on a chart or geographical map of the location of power distribution system 1150). Infrared imaging system 100 may be configured to identify each component or portion of the component in the resulting ortho-mosaic image, such as by a provided mapping of identification numbers for components of power distribution system 1150.

After such mapping, flight platform 110 may be configured to reduce an altitude or otherwise adjust a position of infrared camera 140 to allow for relatively high resolution/ detail inspection of individual components of power distribution system 1150 and corresponding radiometric thermal image histogram analysis, pattern analysis, and/or other image or structure analysis, as described herein. Such analysis may include pattern recognition and/or reporting of a percentage of array not performing according to a set or provided operating characteristic.

In additional embodiments, a series of infrared images captured by infrared camera 140 may be analyzed to detect image artifacts and/or anomalies during flight that do not move relative to the image frame border; moving anomalies likely result from glint and can be compensated for or removed from analysis, non-moving anomalies likely indicate problem areas with power distribution system 1150 that should be investigated further. In various embodiments, multiple time lapsed flights of flight platform 110 may be performed to allow for time differentiated comparisons of panels of power distribution system 1150, which can be used to track degradation over time and indicate preemptive maintenance.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

The invention claimed is:

1. A system comprising:
an infrared camera configured to be mounted to a flight platform and to capture thermal images of a target from the flight platform;
an irradiance detector configured to be disposed on the flight platform and to detect a background radiance associated with the target from the flight platform; and
a logic device, wherein the logic device is configured to:
receive the thermal images captured by the infrared camera and the background radiance from the irradiance detector, and
determine a radiance adjustment associated with the target that is based, at least in part, on the background radiance, wherein the radiance adjustment is configured to compensate for a reflected background radiance reflected by the target towards the infrared camera and captured within the thermal images by the infrared camera, wherein the compensating reduces a relative magnitude of the reflected background radiance relative to total radiance in the thermal images of the target to improve accuracy of the thermal images of the target,
wherein:
the target comprises a solar panel array;
the irradiance detector is configured to detect a magnitude and a direction of the background radiance; and
the logic device is configured to determine the radiance adjustment based, at least in part, on the detected magnitude and direction of the background radiance, an angle of incidence of the background radiance, an angle of an imaged surface of the target, and an orientation of the infrared camera.

2. The system of claim 1, wherein the logic device is configured to:
apply the radiance adjustment associated with the target to the thermal images to compensate for the reflected background radiance reflected by the target towards the infrared camera to improve radiometric accuracy of temperature data of the thermal images of the target;
wherein the logic device is configured to receive emissivity of the target; and
the determining the radiance adjustment comprises determining the radiance adjustment associated with the target based, at least in part, on the emissivity and on a relative reflection angle at which the reflected background radiance impinges on the infrared camera; and
wherein the system further comprises:
the flight platform; and
wherein the infrared camera is mounted to the flight platform, and the irradiance detector is disposed on the flight platform to detect the background radiance when facing away from the target.

3. The system of claim 1, wherein:
the logic device is configured to receive an air temperature associated with the target from an air temperature sensor and/or a relative humidity associated with the target from a relative humidity sensor;
the determining the radiance adjustment comprises determining the radiance adjustment associated with the target based, at least in part, on the air temperature and/or the relative humidity; and
the logic device is further configured to report a temperature of the target.

4. The system of claim 1, wherein:
the irradiance detector is limited to a spectrum associated with the infrared camera;
at least one of the thermal images includes thermal image data of a calibration target, and wherein the logic device is configured to:
determine the radiance adjustment based, at least in part, on the thermal image data of the calibration target.

5. The system of claim 1, wherein:
the compensating comprises subtracting the reflected background radiance from the thermal images captured by the infrared camera.

6. The system of claim 1, wherein:
the logic device is configured to determine thermal profiles for individual panels of the solar panel array based, at least in part, on an expected conversion rate of incidence radiance to output energy and the background radiance from the irradiance detector.

7. A system comprising:
an infrared camera configured to be mounted to a flight platform and to capture thermal images of a target from the flight platform;
an irradiance detector configured to be disposed on the flight platform and to detect a background radiance associated with the target from the flight platform; and
a logic device, wherein the logic device is configured to:
receive the thermal images captured by the infrared camera and the background radiance from the irradiance detector, and
determine a radiance adjustment associated with the target that is based, at least in part, on the background radiance, wherein the radiance adjustment is configured to compensate for a reflected background radiance reflected by the target towards the infrared camera and captured within the thermal images by the infrared camera, wherein the compensating reduces a relative magnitude of the reflected background radiance relative to total radiance in the thermal images of the target to improve accuracy of the thermal images of the target,
wherein the target comprises one or more power distribution system components, and wherein the logic device is configured to:
detect the one or more power distribution system components in at least one of the thermal images;
receive selection of at least one of the detected one or more power distribution system components; and
determine a flight trajectory for the flight platform corresponding to the selected at least one of the detected one or more power distribution system components.

8. The system of claim 7, further comprising the flight platform, wherein the logic device is configured to:
direct the flight platform to follow the determined flight trajectory; and
capture a series of the thermal images encompassing a substantially continuous length of the selected at least one of the detected one or more power distribution system components.

9. The system of claim 7, wherein the one or more power distribution system components comprises one or more power distribution lines, and wherein the detecting the one or more power distribution system components comprises:
applying the radiance adjustment associated with the target to the thermal images to generate radiance compensated thermal images compensating for the reflected background radiance reflected by the one or more power distribution lines towards the infrared camera; and
detecting the one or more power distribution lines in at least one of the radiance compensated thermal images.

10. The system of claim 7, wherein the logic device is configured to:
determine a series of component temperatures corresponding to portions of the selected at least one of the detected one or more power distribution system components and the determined flight trajectory;
detect temperature gradients, temperature maximums, and/or temperature minimums across the portions based on the series of component temperatures; and
detect temperature excursions of the selected at least one of the detected one or more power distribution system components based, at least in part, on the detected temperature gradients, temperature maximums, and/or temperature minimums.

11. A method comprising:
receiving thermal images of a target captured from a flight platform by an infrared camera;
receiving a background radiance associated with the target from an irradiance detector, and
determining a radiance adjustment associated with the target that is based, at least in part, on the background radiance, wherein the radiance adjustment is configured to compensate for a reflected background radiance reflected by the target towards the infrared camera and captured within the thermal images by the infrared camera, wherein the compensating reduces a relative magnitude of the reflected background radiance relative to total radiance in the thermal images of the target to improve a radiometric accuracy of the thermal images of the target,
wherein:
the target comprises a solar panel array;
the irradiance detector is configured to detect a magnitude and a direction of the background radiance; and
the method comprises determining the radiance adjustment based, at least in part, on the detected magnitude and direction of the background radiance, an angle of incidence of the background radiance, an angle of an imaged surface of the target, and an orientation of the infrared camera.

12. The method of claim 11, further comprising:
applying the radiance adjustment associated with the target to the thermal images to compensate for the reflected background radiance reflected by the target towards the infrared camera to improve the radiometric accuracy of temperature data of the thermal images of the target;
wherein the irradiance detector detects the background radiance when facing away from the target; and
wherein the determining the radiance adjustment comprises determining the radiance adjustment associated with the target based, at least in part, on emissivity of the target and on a relative reflection angle at which the reflected background radiance impinges on the infrared camera.

13. The method of claim 11, further comprising receiving an air temperature associated with the target from an air temperature sensor and/or a relative humidity associated with the target from a relative humidity sensor, wherein:
the determining the radiance adjustment comprises determining the radiance adjustment associated with the target based, at least in part, on the air temperature and/or the relative humidity; and
the method further comprises reporting a temperature of the target.

14. The method of claim 11, wherein:
the irradiance detector is limited to a spectrum associated with the infrared camera;
at least one of the thermal images includes thermal image data of a calibration target, and wherein the method comprises:
determining the radiance adjustment based, at least in part, on the thermal image data of the calibration target.

15. The method of claim 11, wherein:
the compensating comprises subtracting the reflected background radiance from the thermal images captured by the infrared camera.

16. The method of claim 11, wherein:
the method further comprises determining thermal profiles for individual panels of the solar panel array based, at least in part, on an expected conversion rate of incidence radiance to output energy and the background radiance from the irradiance detector.

17. A method comprising using the system of claim 7, wherein using the system comprises:
   receiving thermal images of the target captured from the flight platform by the infrared camera;
   receiving the background radiance associated with the target from the irradiance detector, and
   determining the radiance adjustment associated with the target,
   wherein the target comprises one or more power distribution system components, and wherein the method further comprises:
   detecting the one or more power distribution system components in at least one of the thermal images;
   receiving selection of at least one of the detected one or more power distribution system components; and
   determining a flight trajectory for the flight platform corresponding to the selected at least one of the detected one or more power distribution system components.

18. The method of claim 17, further comprising:
   directing the flight platform to follow the determined flight trajectory; and
   capturing a series of the thermal images encompassing a substantially continuous length of the selected at least one of the detected one or more power distribution system components.

19. The method of claim 17, wherein the one or more power distribution system components comprises one or more power distribution lines, and wherein the detecting the one or more power distribution system components comprises:
   applying the radiance adjustment associated with the target to the thermal images to generate radiance compensated thermal images compensating for the reflected background radiance reflected by the one or more power distribution lines towards the infrared camera; and
   detecting the one or more power distribution lines in at least one of the radiance compensated thermal images.

20. The method of claim 17, further comprising:
   determining a series of component temperatures corresponding to portions of the selected at least one of the detected one or more power distribution system components and the determined flight trajectory;
   detecting temperature gradients, temperature maximums, and/or temperature minimums across the portions based on the series of component temperatures; and
   detecting temperature excursions of the selected at least one power distribution system components based, at least in part, on the detected temperature gradients, temperature maximums, and/or temperature minimums.

* * * * *

UNITED STATES PATENT AND TRADEMARK OFFICE
CERTIFICATE OF CORRECTION

| | | |
|---|---|---|
| PATENT NO. | : 11,378,458 B2 | |
| APPLICATION NO. | : 15/984176 | |
| DATED | : July 5, 2022 | |
| INVENTOR(S) | : Jeffrey D. Frank et al. | |

It is certified that error appears in the above-identified patent and that said Letters Patent is hereby corrected as shown below:

In the Claims

In Claim 20, Column 32, Line 23, change "one power distribution" to --one of the detected one or more power distribution--.

Signed and Sealed this
Second Day of August, 2022

*Katherine Kelly Vidal*

Katherine Kelly Vidal
*Director of the United States Patent and Trademark Office*